United States Patent [19]
Okamoto et al.

[11] Patent Number: 5,829,182
[45] Date of Patent: *Nov. 3, 1998

[54] INTRA-LINE FISHING ROD

[76] Inventors: Toshihisa Okamoto, 2-1-12-308, Hanakoganei, Kodaira-shi, Tokyo; Masaru Akiba, 2111-3, Kume, Tokorozawa-shi, Saitama; Shigeru Yamamoto, 221-1, Noda, Iruma-shi, Saitama; Tomoyoshi Tsurufuji, 877-5, Kitairiso, Sayama-shi, Saitama, all of Japan

[*] Notice: This patent issued on a continued prosecution application filed under 37 CFR 1.53(d), and is subject to the twenty year patent term provisions of 35 U.S.C. 154(a)(2).

[21] Appl. No.: 557,330

[22] Filed: Nov. 14, 1995

[30] Foreign Application Priority Data

| Nov. 14, 1994 | [JP] | Japan | 6-304344 |
| Nov. 17, 1994 | [JP] | Japan | 6-308222 |
| Dec. 24, 1994 | [JP] | Japan | 6-336170 |
| Apr. 24, 1995 | [JP] | Japan | 7-123207 |
| Apr. 24, 1995 | [JP] | Japan | 7-123208 |
| Apr. 24, 1995 | [JP] | Japan | 7-123209 |
| Apr. 29, 1995 | [JP] | Japan | 7-129591 |

[51] Int. Cl.⁶ .................................................. A01K 87/02
[52] U.S. Cl. .................................................. 43/24
[58] Field of Search ................................ 43/18.1, 24

[56] References Cited

U.S. PATENT DOCUMENTS

4,212,126  7/1980  Barnett ........................................ 43/24

FOREIGN PATENT DOCUMENTS

| 0102873 | 3/1984 | European Pat. Off. . |
| 1178437 | 5/1959 | France . |
| 1374960 | 12/1964 | France . |
| 1385014 | 12/1965 | France . |
| 2666721 | 3/1992 | France . |
| 2681507 | 3/1993 | France . |
| 2641269 | 3/1978 | Germany . |
| 3246801 | 6/1984 | Germany . |
| 56-127032 | 10/1981 | Japan . |
| 63-129466 | 8/1988 | Japan . |
| 5-29376 | 4/1993 | Japan . |

*Primary Examiner*—Thomas Price
*Attorney, Agent, or Firm*—Longacre & White

[57] ABSTRACT

The invention concerns an intra-line fishing rod. In an embodiment, loose fishline guide members (8, 8', 8") are provided in such a manner that they are projected into the interior of a large diameter rod pipe (2) and can be held there. The loose fishline guide members (8, 8', 8") are also structured such that, when a small diameter rod pipe (3) jointed to the leading end of the large diameter rod pipe (2) is stored into the interior of the large diameter rod pipe (2), the loose fishline guide members can be moved backwardly from their respective provision positions.

9 Claims, 23 Drawing Sheets

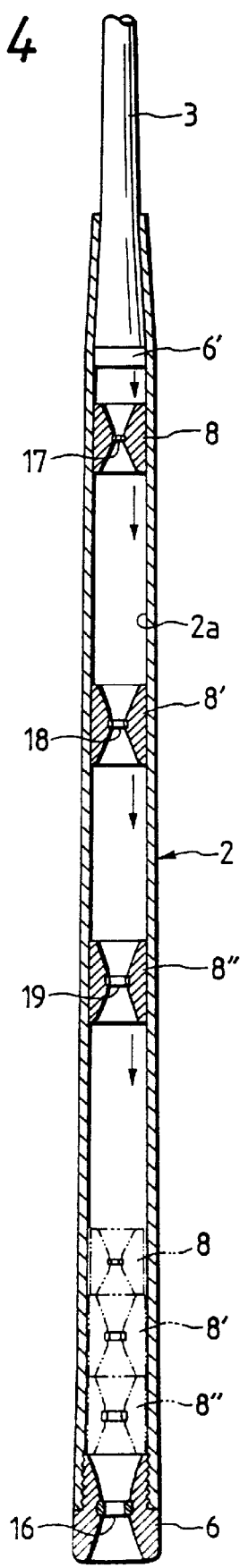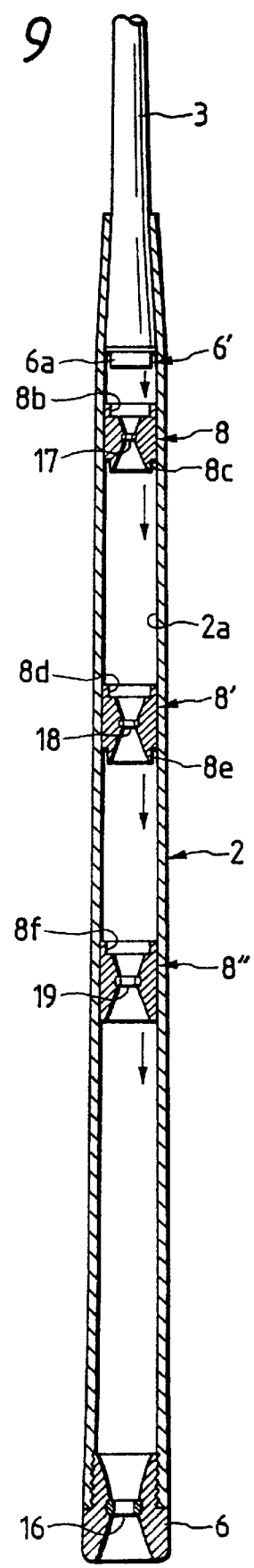

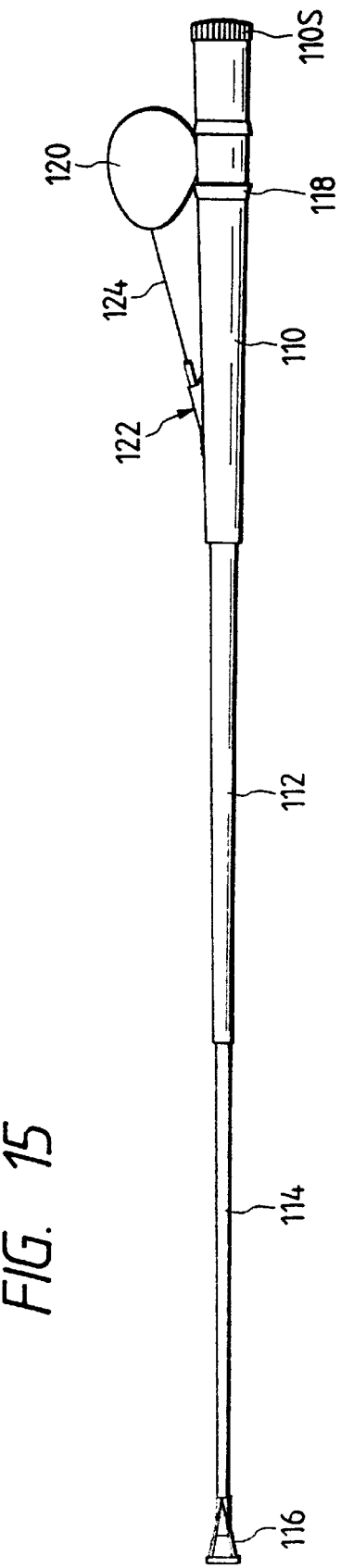
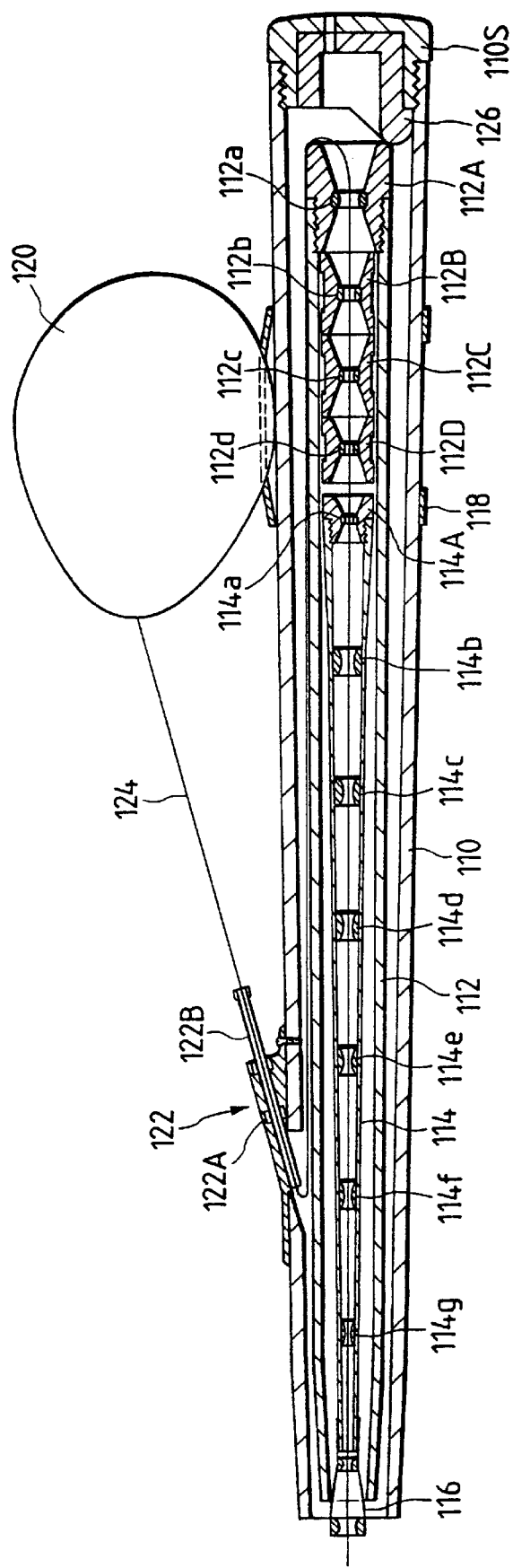

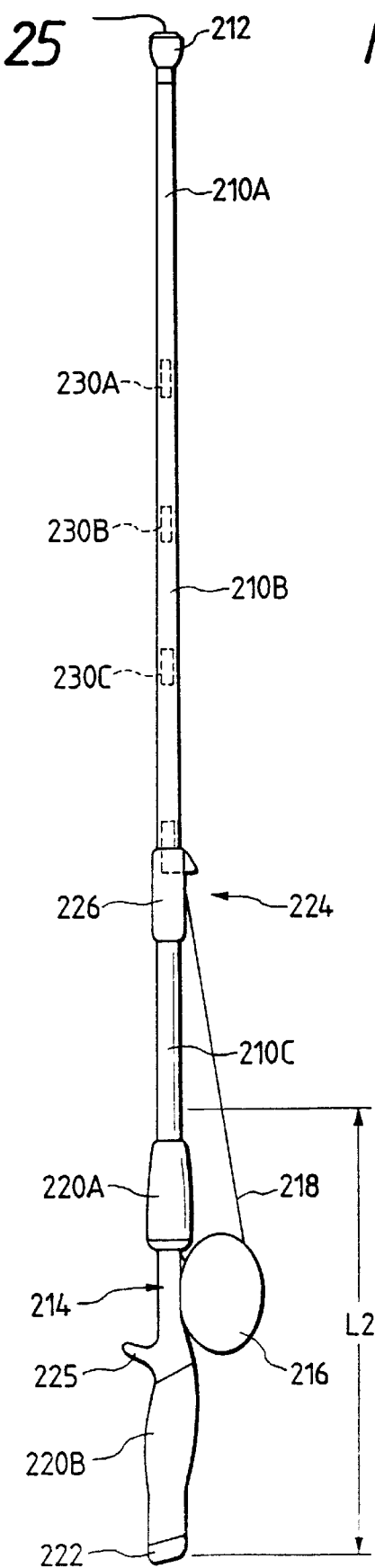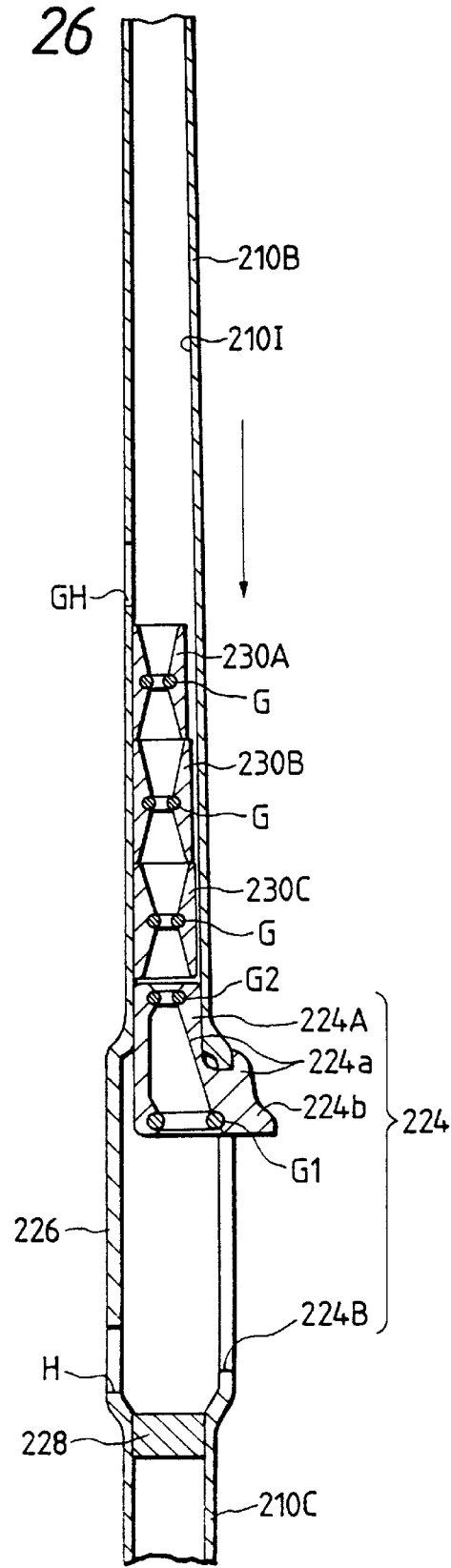

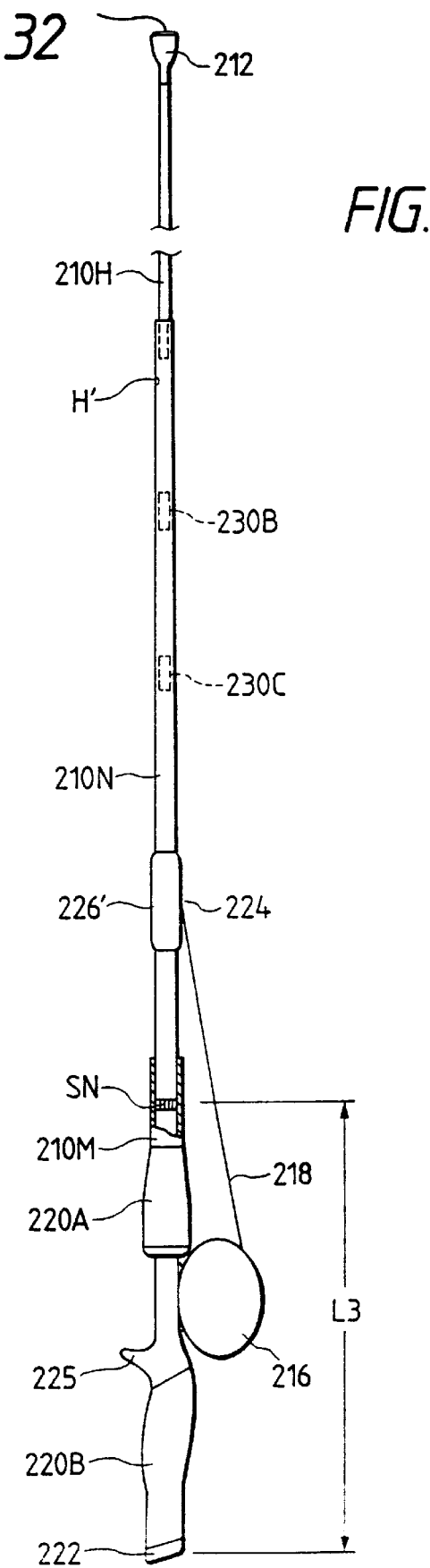
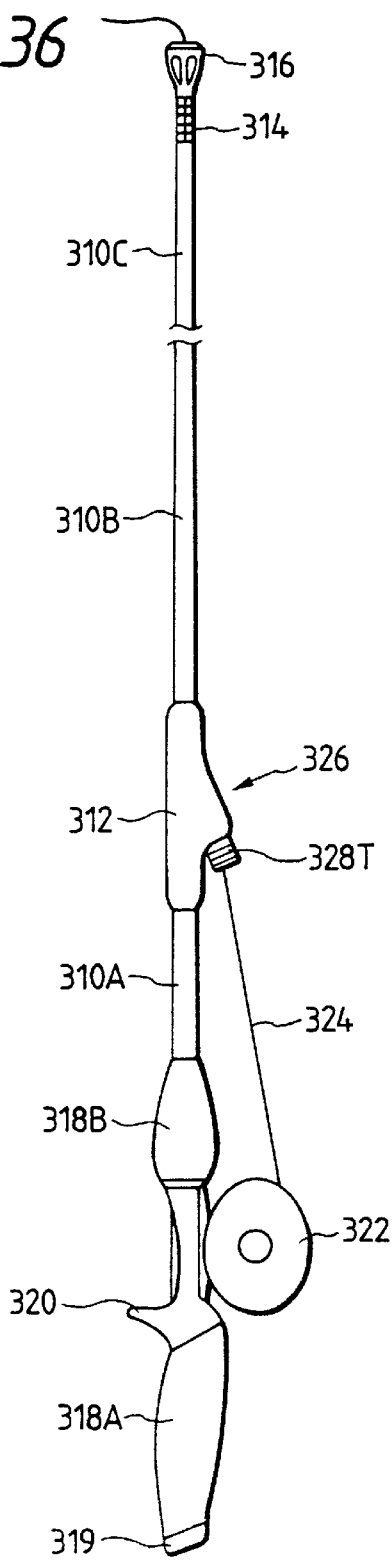

ively smooth fishline travel. Further, since the cylindrical
INTRA-LINE FISHING ROD

BACKGROUND OF THE INVENTION

The present invention relates to an intra-line fishing rod having a hollow core through which a fishline can pass. The present invention can be applied to all kinds of fishing rods regardless of the classification thereof, which include: a swing-out and telescopic joint type fishing rod, an ordinary removable joint type fishing rod, a single integral rod pipe fishing rod; a lure fishing rod such as a throwing fishing rod, a bait rod, a spinning rod and the like; and, other kinds of casting rods, a boat fishing rod, a seashore fishing rod, and the like.

As an example of a fishing rod of a joint type that a fishline is inserted through a rod pipe and is guided to the top of the rod, there is disclosed in Japanese Utility Model Publication No. 63-129466 of Showa a fishing rod in which a fishline is inserted into a hollow portion and guided by an intermediate ring formed in the inside of the rod pipe.

The fishing rod of that type suffers from a problem in that, although the provision of the intermediate ring makes it possible to guide the fishline smoothly, when a middle rod situated forwardly of the intermediate ring is stored into the hollow portion formed in the inside of the rod pipe, the middle rod is butted against the intermediate ring so that the middle rod cannot be stored further backwardly of the intermediate ring.

In Japanese Patent Publication No. 56-127032 of Showa, there is disclosed an intra-line fishing rod in which a large number of rings (fishline guides) are disposed in the interior of a rod pipe. In this publication, there are disclosed two embodiments: that is, in one embodiment, the fishline guides are fixed to the interior of the rod pipe by use of adhesives; and, in the other, they are not fixed completely so that they can be replaced.

However, in the embodiment in which the fishline guide are not fixed with adhesives but are held simply, there is a possibility that the rod pipe can be loosened during the repeated fishing operation and the fishline guides can at worst, be moved out of position. This may produce an unpleasant noise or increase the frictional resistance to the fishline and, in some cases, can cause the fishline to be cut. On the other hand, if the fishline guides are pushed into the interior of the rod pipe too much in order that they are free from the removal, then there is a possibility that the rod pipe can be broken.

Further, the intra-line fishing rods disclosed in the above publications are basically designed such that the fishline is permanently held by the interior of the rod pipe. Thus, the dirt attracted to the fishline is accumulated in the neighborhood of the fishline guides projecting internally and, if the accumulated dirt is left uncleaned for a long period of time, then it is solidified to thereby hinder the smooth insertion of the fishline, or in some cases, cause the fishline to be cut. Therefore, it is indispensable to clean the accumulated dirt but, however, in the fishing rod disclosed in the above publications, not only the fishline guides but also the inner surface of the rod pipe are difficult to be cleaned. Further, it is difficult to take out and mount the fishline guides, which in turn makes it difficult to replace the fishline guides when they are worn.

Also, in Japanese Utility Model Publication No. 5-29376 of Heisei, there is disclosed a structure for an intra-line fishing rod, in which a guide passage element for guiding a fishline to the top end of a rod pipe is formed of a cylindrical member sufficiently smaller than the inside diameter of the main body of the rod pipe, and the guide passage element is fixed to the inside of the rod pipe.

In the structure, when the cylindrical member having a small diameter is disposed in the interior portion of the rod pipe and the fishline is guided by the cylindrical member, the fishline is contacted with the inner surface of the whole cylindrical member and thus, when compared with a structure in which the fishline is contacted with fishline guide rings spaced in the longitudinal direction, the resistance to the fishline is large. Also, when the fishline is introduced from an external reel into the interior portion of the rod pipe, the fishline is generally caused to swing and, due to this swinging motion, the fishline is contacted with the inner surface of the cylindrical member. However, since the cylindrical member is small in diameter, it provides only a small space for insertion of the fishline and thus the cylindrical member is strongly contacted by the swinging fishline, so that the fishline resistance is increased accordingly. Further, when the cylindrical member used to guide the fishline is formed of flexible material, generally, the wear resistance of the cylindrical member is considerably low and, therefore, when it is used only for a short period, the cylindrical member will be worn in the local portions thereof which are frequently contacted by the fishline, thereby resulting in the increased fishline resistance. Moreover, since the cylindrical member provides a large gap with respect to the inner surface of the rod pipe, the cylindrical member becomes rickety or produces uncomfortable noise during the fishing operation, and, if the cylindrical member is formed of flexible material, then it is easily curved to thereby increase the contact resistance with respect to the fishline.

SUMMARY OF THE INVENTION

The present invention aims at eliminating the problems found in the above-mentioned conventional fishing rods.

Accordingly, it is an object of the invention to provide an intra-line fishing rod which not only can guide a fishline smoothly but also, when a small diameter rod pipe is stored into a large diameter rod pipe, can move a fishline guide (a loose fishline guide member) backwardly to thereby be able to store the small diameter rod pipe deeply into the large diameter rod pipe.

Also, it is another object of the invention to provide an intra-line fishing rod which, when a plurality of fishing guides are provided, is able to move them to their respective given positions easily and smoothly and hold them at such given positions.

It is another object of the invention to provide an intra-line fishing rod in which a rod pipe is difficult to be broken when fishline guides are held in the interior of the rod pipe, the fishline guides can be held at their respective given positions easily and positively, and the fishline guides are difficult to come off during a fishing operation but can be easily removed for maintenance such as cleaning, replacement and the like.

In order to attain the above-noted objects, the invention provides an intra-line fishing rod, in which a loose fishline guide member is provided in such a manner that it can be projected into the interior of a large diameter rod pipe and can be held there, and the loose fishline guide member is also structured such that, when a small diameter rod pipe jointed to the leading end of the large diameter rod pipe is stored into the interior of the large diameter rod pipe, it can be moved backwardly from its provision position.

The above-mentioned large and small diameter rod pipes are jointed in a swing-out and telescopic manner but, however, these rod pipes must not be always be jointed to the remaining rod pipes forming the fishing rod but the former may be connected to the latter in an ordinary manner.

According to the invention, with reference to FIG. 3 and the like (to be discussed later), a top rod 3 is drawn out from a middle rod 2, the middle rod 2 is drawn out from a base rod 1, and then they are jointed to one another. In this operation, if the fishing rod is moved up and down with the leading end of the middle rod 2 facing downward, then three loose fishline guide members 8, 8' and 8" disposed in the inner hollow portion (interior) 2a of the middle rod 2 formed as a large diameter rod pipe are respectively moved in the longitudinal direction of the middle rod 2 and are then held at their respective given positions shown by two-dot chained lines a, b, c in FIGS. 2, 3 or as shown in FIG. 4. Alternatively, instead of moving up and down the middle rod 2, by swinging the fishing rod after the rear end portion of the base rod 1 is held by hand or after the middle rod 2 is drawn out from the base rod 1 and the rear end portion of the middle rod 2 is held by hand, that is, by applying centrifugal forces to the respective loose fishline guide members, the loose fishline guide members may be moved to and held at their respective given positions. When storing the fishing rod, the top rod 3 formed as a small diameter rod pipe is pushed into the middle rod 2 formed as a large diameter rod pipe while the respective loose fishline guide members are moved backwardly and are thus stored in their respective storage positions shown by solid lines in FIGS. 2 and 3, so that the small diameter rod pipe can be stored deeply.

According to the invention, there is provided an intra-line fishing rod in which the interior of the rod pipe of the fishing rod is formed at least partially in a tapered shape and includes therein a plurality of loose fishline guide members structured such that they can be projected into the interior of the rod pipe to be held there and can be removed from their holding with given force, the maximum outside diameter dimension of the forwardly situated loose fishline guide member is equal to or smaller than that of the backwardly situated loose fishline guide member, and the loose fishline guide members can be stored in such a manner that they are separated from one another.

Here, the separated state includes a state in which the loose fishline guide members are secured to one another with a slight force.

If the loose fishline guide members are stored in such a manner that they are separated from one another, then the loose fishline guide members can be moved forward easily by applying a centrifugal force to them or by moving the rod up and down and, in this case, the guide members can be moved forward independently of one another and thus they never interfere with the movements of the other members, that is, they can be moved forward smoothly. This can apply to not only a swing-out type fishing rod but also an ordinary joint type fishing rod.

According to the invention, there is provided an intra-line fishing rod of a type that a small diameter rod pipe is jointed to the leading end portion of a large diameter rod pipe in a swing-out manner, in which the interior of the large diameter rod pipe is formed at least partially in a tapered shape, a plurality of loose fishline guide members disposed in the interior of the large diameter rod pipe are structured such that they can be projected and held and can be removed from their holding with given force, the maximum outside diameter dimension of the forwardly situated loose fishline guide member is equal to or smaller than that of the backwardly situated loose fishline guide member, and, when the small diameter rod pipe is stored, the plurality of loose fishline guide members are respectively connected to the rear end portion of the small diameter rod pipe, while the more backwardly the loose fishline guide members are situated the smaller the connection holding forces thereof are.

When the small diameter rod pipe is stored, a plurality of loose fishline guide members are mutually connected to the rear end portion of the small diameter rod pipe. Since the interior of the large diameter rod pipe has a tapered shape portion, if the more backwardly the loose fishline guide members are situated the smaller their connection holding forces are, when the small diameter rod pipe is drawn out from the large diameter rod pipe, the loose fishline guide members, beginning at the most-backwardly situated guide member having the largest outside diameter dimension, are sequentially contacted with the inner surface of the large diameter rod pipe. In this case, before the most-backwardly situated loose fishline guide member now in contact with the inner surface of the large diameter rod pipe provides a frictional force that removes the connection of the loose fishline guide member situated just before it, only the loose fishline guide member now in contact is removed from connection with the large diameter rod pipe inner surface and is held at the removed position. This eliminates the inconvenience that two mutually adjoining loose fishline guide members can be held at the same position while they are superimposed on each other and thus one of them can be removed during use of the fishing rod. That is, the loose fishline guide members can be moved and held easily and smoothly.

According to the invention, there is provided an intra-line fishing rod of a type that a small diameter rod pipe is jointed to the leading end portion of a large diameter rod pipe in a swing-out manner, in which the interior of the large diameter rod pipe is formed at least partially in a tapered shape, a plurality of loose fishline guide members disposed in the interior of the large diameter rod pipe are structured such that they can be stored while they are separated from one another and also such that they can be projected into and held in the interior of the large diameter rod pipe and can be removed from their holding with given force, the maximum outside diameter dimension of the forwardly situated loose fishline guide member is equal to or smaller than that of the backwardly situated loose fishline guide member, a guide hold portion is provided in the rear end portion of said small diameter rod pipe in such a manner that it projects in the axial direction of the rod pipe, and, when the small diameter rod pipe is stored, the plurality of loose fishline guide members can be held while the guide hold portion extends through the plurality of loose fishline guide members.

The separated state here includes a state in which the loose fishline guide members are secured to one another with a slight force.

According to the invention, the small diameter rod pipe includes in the rear end portion thereof the guide hold portion which is projected in the axial direction of the small diameter rod pipe, and the plurality of loose fishline guide members, which are structured such that they can be stored in a mutually separated manner when the small diameter rod pipe is stored, can be held at their respective positions by allowing the guide hold portion to extend through them. In this case, since the interior of the large diameter rod pipe has a tapered shape, when the small diameter rod pipe is drawn out from the large diameter rod pipe, the loose fishline guide members, beginning at the most-backwardly situated loose fishline guide member having the largest outside diameter dimension, are sequentially contacted with the inner surface of the large diameter rod pipe. In this operation, each time the loose fishline guide member is contacted with the inner surface of the large diameter rod pipe, the frictional force can overcome the extension holding force of the guide hold portion, so that only the subject loose fishline guide member can be held at its contact position of the large diameter rod pipe. This eliminates the inconvenience that two mutually adjoining loose fishline guide members can be held at the same position while they are superimposed on each other, and that one of them can be removed during use of the fishing rod. That is, the loose fishline guide members can be moved and held easily and smoothly.

According to the invention, there is provided an intra-line fishing rod in which a loose fishline guide member including a hard or wear resisting fishline guide can be pressed against the inner wall of a rod pipe. Since the loose fishline guide member including the fishline guide can be elastically pressed against the inner wall of the rod pipe, the loose fishline guide member can be held easily and positively at its given position and, even if the rod pipe is flexed during the fishing operation, the loose fishline guide member is difficult to slip out of position because it is in pressure contact with the rod pipe inner wall due to its elastic force. Also, when holding the loose fishline guide member, the elasticity of the loose fishline guide member makes it difficult for the rod pipe to be broken. When maintenance or the like is required, the loose fishline guide member can be removed easily by pushing it or catching and pulling it by use of suitable means such as a small diameter rod pipe or other rod-shaped member, or by applying shocks in the axial direction of the fishing rod to the base portion of the fishing rod.

In the rod, the area of the loose fishline guide member that can be elastically pressed against the rod pipe inner wall is interrupted at least in a circumferential or longitudinal direction of the loose fishline guide member. Since the elastically contactable area of the loose fishline guide member with the rod pipe inner wall is interrupted at least in the circumferential or axial direction thereof, after the loose fishline guide member is elastically pressure contacted with and held to the rod pipe, when removing it, even if the inner surface of the rod pipe is wet, the attraction of the loose fishline guide member to the rod pipe inner wall due to water and the like is prevented and thus not only it can be removed easily from the rod pipe inner wall with a given force but also it can be carried to other places easily.

In the rod, at least part of the contact area of the loose fishline guide member with the rod pipe inner wall is formed of rubber or synthetic resin, and there is provided in the loose fishline guide member a member formed of material which is larger in specific gravity than the above-mentioned rubber or synthetic resin. Due to provision of the member having large specific gravity, the loose fishline guide member is increased in weight, which not only can facilitate the smooth movement of the loose fishline guide member but also can increase the advancing force of the loose fishline guide member into the rod pipe in order that the loose fishline guide member can be held to the rod pipe inner wall by means of a body force such as a centrifugal force or the like.

According to the present invention, a plurality of loose fishline guide members are disposed within the rod pipe in such a manner that they are spaced apart from one another and, in the surface of each of such loose fishline guide members, there is provided a mark which can discriminates at least its insertion sequence or insertion direction. Since the mark for discriminating at least the insertion sequence or insertion direction of the loose fishline guide member is provided on the surface of each of the loose fishline guide members, the sizes as well as the front and rear portions of the loose fishline guide members can be easily discriminated. Due to this, the loose fishline guide members can be inserted into the rod pipe quickly and accurately, the loose fishline guide members can be held at their respective given positions and are difficult to loosen, and the fishline guide members are prevented from damaging the fishline inserted and getting rickety. Besides, it is also possible to prevent the rod pipe from being broken due to the insertion of the loose fishline guide members in a wrong sequence or direction.

According to the invention, the whole length of the loose fishline guide member is set larger than the inside diameter dimension of the rear end of a tapered rod pipe disposed within the loose fishline guide member and formed in a tapered shape allowing for a straight portion. Since the whole length of the loose fishline guide member is set longer than the inside diameter dimension of the rear end of the tapered rod pipe in which the loose fishline guide member is disposed, the loose fishline guide member is difficult to incline or turn upside down, and, when advancing the loose fishline guide member, it is prevented from being caught or hitched on something, so that it can advance smoothly. Also, if the loose fishline guide member is inclined or turned upside down, it must be advanced forcibly. However, according to the present invention, as mentioned above, because the loose fishline guide member is difficult to incline or turn upside down, the loose fishline guide member is prevented from being broken for such reason.

According to the invention, there is provided an intra-line fishing rod, wherein a fishline introduction portion for introducing a fishline drawn out from a reel into the interior of a rod pipe is provided in front of a reel fixing device for fixing the reel, the interior of the rod pipe situated forwardly of the fishline introduction portion is formed at least partially in a tapered shape, one or more loose fishline guide members are disposed in the tapered rod pipe interior portion in such a manner that they can be held at their given positions and can be moved backwardly of the given positions, and there is provided a stopper mechanism for stopping the backward movements of the loose fishline guide members in the neighborhood of the fishline introduction portion. Here, the term "neighborhood" means a range of approx. 30 cm before and behind the fishline introduction portion.

According to the invention, the fishline is guided smoothly by the loose fishline guide member so that the insertion resistance of the fishline can be reduced, and, since the loose fishline guide member can be moved to the neighborhood of the fishline introduction portion having a large diameter by holding the rod pipe in the vertical direction and moving it up and down or dropping it down, or by pushing the loose fishline guide member out of the rod top portion by means of a proper linear (rod-like) means, the loose fishline guide member can be easily cleaned or washed with water through the fishline introduction portion. Further, when the loose fishline guide member is moved backwardly, the loose fishline guide member is removed from the most part of the interior portion of the rod pipe situated before the fishline introduction portion, which is the insertion area of the fishline, and thus the most part of the rod pipe interior portion becomes hollow. This makes it easy to clean the rod pipe interior portion or wash it with water especially from the front end of the rod pipe (it is also possible to wash the rod pipe interior portion forward with the water flowing from the fishline introduction portion).

Further, since the fishline introduction portion is disposed at a position situated in front of the reel fixing device and also since the loose fishline guide member can be moved to and stopped in the neighborhood of the fishline introduction portion by the stopper mechanism, simply by swinging the fishing rod while holding the rear portion of the reel fixing device, a centrifugal force corresponding to the distance between the holding portion and the loose fishline guide member can be applied to the loose fishline guide member, so that the loose fishline guide member can be moved forward smoothly within the tapered rod pipe interior portion and can be held at a given position. Therefore, after the loose fishline guide member is once moved for maintenance or the like, the loose fishline guide member can be mounted again at its original position in the rod pipe very easily.

According to the invention, the fishline guide members are structured such that they can be taken out externally from the fishline introduction portion or from a wide and long hole formed in the rod pipe separately from the fishline introduction portion. Thanks to this, the loose fishline guide member can be taken out and the loose fishline guide member and the interior portion of the rod pipe can be cleaned easily, or the loose fishline guide member can be easily replaced with a new one.

According to the invention, a fishline introduction portion for introducing a fishline drawn out from a reel into the interior of a rod pipe is provided in front of a reel fixing device for fixing the reel, the interior of the rod pipe situated forwardly of the fishline introduction portion is formed at least partially in a tapered shape, one or more loose fishline guide members are disposed in the tapered rod pipe interior portion in such a manner that they can be held at their respective given positions and can be moved backwardly of the given positions, and there is provided a stopper mechanism for stopping the backward movements of the loose fishline guide members at a position situated 20 cm or more forwardly of the rear end of the fishing rod.

According to the invention, the fishline is guided smoothly by the loose fishline guide member so that the insertion resistance of the fishline can be reduced. Also, the loose fishline guide member can be moved by holding the rod pipe in the vertical direction and moving it up and down or dropping it down, or by pushing the loose fishline guide member out of the rod top portion by means of a proper linear or rod-like means, and, after then, the loose fishline guide member can be stopped by means of the stopping action of the stopper mechanism. Further, when the loose fishline guide member is moved backwardly, the loose fishline guide member is removed from the interior portion of the pipe situated in front of the fishline introduction portion, which is the insertion area of the fishline, so that such rod pipe interior portion becomes hollow and smooth. Thanks to this structure, such rod pipe interior portion can be easily cleaned or washed with water especially from the front end of the rod pipe, or the rod pipe interior portion can be washed forward with the water poured from the fishline introduction portion. Further, the loose fishline guide member can also be cleaned or washed with water through the fishline introduction portion.

Further, since the loose fishline guide member can be moved to and stopped at a position approx. 20 cm or more in front of the rear end of the fishing rod by the stopper mechanism, simply by holding the rear end portion of the fishing rod and swinging the fishing rod, a centrifugal force corresponding to the distance between the fishing rod rear end holding portion and the position of the loose fishline guide member can be applied to the loose fishline guide member, so that the loose fishline guide member can be moved forward smoothly within the rod pipe interior portion situated and can be held at a given position in the rod pipe interior portion. Therefore, after the loose fishline guide member is once moved for maintenance or the like, the loose fishline guide member can be mounted again at its original position in the rod pipe very easily.

According to the invention, there are provided a top rod, one or more middle rods, and a base rod, the top rod and middle rods are jointed to each other in a swing-out manner, the base rod and middle rods are jointed to each other in an ordinary manner in such a manner that they can be separated from each other in the rod top end direction, one or more loose fishline guide members are provided in the interior of at least one of the middle rods in such a manner that they can be held at their respective given positions, and the loose fishline guide members are structured such that they can be inserted and removed from the rear end portion of the middle rod.

According to the invention, the fishing rod comprises a base rod, a middle rod and a top rod and thus the storage dimension of the fishing rod can be shortened, so that the fishing rod is convenient for portability and storage. Also, the headmost joint portion of the fishing rod is a swing-out type joint which can prevent the removal of the headmost joint portion that is generally easiest to be removed during the fishing operation, so that the fishing operation can be performed freely. Further, since there are disposed loose fishline guide members in the middle rod and other rearwardly situated middle rods and also the loose fishline guide members are structured such that they can be inserted into and removed from the respective middle rods through the respective rear end portions thereof, the interior portions of the middle rods and the loose fishline guide members can be cleaned easily as well as the replacement of the loose fishline guide members is easy.

Besides, in mounting the loose fishline guide member, simply by swinging the fishing rod while holding the holding portion of the base rod, a centrifugal force corresponding to the distance between the base rod holding portion and the loose fishline guide member disposed in the middle rod can be applied to the loose fishline guide member, so that the loose fishline guide member can be moved to and held at a given position due to the centrifugal force.

According to the invention, there is provided a rod bottom part which can be mounted to and removed from a fishing rod, a top rod is jointed to a base rod having a trigger in a swing-out manner, there are provided in the base rod a reel fixing device for fixing a reel and a fishline introduction portion located forwardly of the fixing device, one or more loose fishline guide members are holdably provided in the interior portion of the base rod situated forwardly of the fishline introduction portion, and the interior portion of the base rod situated backwardly of the holding position of the loose fishline guide members is formed so as to have such an inside diameter dimension that allows the loose fishline guide members to be inserted into the base rod interior portion.

According to the invention, there is provided a fishing rod including a trigger, that is, a casting rod. In particular, in the present casting rod, since a loose fishline guide member is holdably disposed in the interior portion of the base rod situated in front of the fishline introduction portion of the base rod, a fishline can be inserted smoothly and thus the insertion resistance of the fishline can be reduced. Also, because the interior portion of the base rod situated in the rear of the holding position of the loose fishline guide member is formed so as to have such an inside diameter dimension that allows the loose fishline guide member to be inserted therethrough, in cleaning or replacement, by removing a rod bottom part which is mounted removably at the rear end of the base rod, the loose fishline guide member can be taken out from the base rod interior portion and also, if the loose fishline guide member is inserted into the base rod interior portion and then the base rod is swung, then the loose fishline guide member can be moved forward to and positioned at a given position due to the centrifugal force or due to the vertical motion of the base rod. Further, the top rod is jointed to the base rod in a swing-out manner, in the portion of the base rod having such an inside diameter that allows the loose fishline guide member to the inserted therethrough, the top rod can be stored up to the rear end of the base rod to thereby be able to minimize the storage dimension of the fishing rod. Thanks to this, the fishing rod is very convenient for carriage, even if the top rod is formed long, the storage dimension of the fishing rod can be shortened and thus the top rod can be formed long accordingly, and, since the joint portion of the top rod to the base rod can be formed at a position situated in the rear portion of the whole fishing rod, the joint portion can be located apart from the greatly flexing portion of the fishing rod. That is, the present invention can provide a casting rod of high quality.

According to the invention, there is provided an intra-line fishing rod, in which there is formed an opening in the fishing rod, a long fishline guide member having an outside diameter of such a dimension as allows itself to be inserted and removed through the opening and having an inwardly projecting fishline guide connected thereto is disposed in such a manner that it is substantially in contact with the inner wall surface of the rod pipe, the fishline guide member is held removably, the head portion of the fishline guide member is situated adjacent to the opening, and the fishline guide member has such a degree of flexibility as allows the fishline guide member to be taken out externally at least through the opening formed in the fishing rod side surface.

The fishline guide connected to the fishline guide member includes a spirally continuous guide as well.

According to the invention, the inwardly projecting fishline guide is disposed in the interior of the fishline guide member and thus the fishline can be guided by the fishline guide in such a manner that it is contacted with only part of the fishline guide in the longitudinal direction thereof. At the same time, since the fishline guide member is held in such a manner that it is substantially in contact with the inner wall surface of the rod pipe, there can be provided a large interior space which can in turn reduce the fishline resistance as much as possible.

The head portion of the fishline guide member is situated adjacent to the opening formed in the side surface of the fishing rod and the fishline guide member has such a degree of flexibility as allows the fishline guide member to be taken out externally through the opening. Thanks to this, when the head portion of the fishline guide member is situated outside the opening, the fishline guide member can be taken out externally by pinching the head portion with fingers and, on the other hand, when the head portion is located in the interior of the rod pipe, the fishline guide member can be taken out externally by catching the head portion by use of proper engaging means, or, when the opening has such a size as allows the little finger to be inserted therethrough, the fishline guide member can be taken out externally by catching the head portion with the little finger. Since the fishline guide member can be taken out externally in this manner, the maintenance such as cleaning and the like of the rod pipe interior portion as well as the maintenance of the fishline guide of the fishline guide member can be executed easily. Further, when a plurality of fishline guides are provided, since the fishline guides are connected to one another, they can be inserted or removed at a time, which can increase the facility of the maintenance of the fishing rod.

Also, because the fishline guide member is held in such a manner that it is substantially in contact with the inner wall surface of the rod pipe, it is stabilized in position and also it is almost prevented from getting rickety or swinging. Further, due to the prevention of the swinging motion of the fishline guide member, the fishline can be inserted smoothly and surely.

Preferably, if an opening formed in the fishline introduction portion is used in place of the above opening formed in the fishing rod, then there can be eliminated the need for provision of a new opening in the fishing rod which results in the lowered strength of the fishing rod.

According to the invention, there is provided a joint type intra-line fishing rod which the rear end portion of a small diameter rod pipe is formed to be freely jointable to the inside of the front end portion of a large diameter rod pipe and a fishline is introduced into the interior portion of a rod pipe from a fishline introduction guide. A plurality of fishline guides are projectingly formed in the interior portion of the large diameter rod pipe situated forwardly of the fishline introduction guide, and the inside diameters of the fishline guides is formed larger than the outside diameter of the small diameter rod pipe. The fishline guides can be provided by mounting parts into the interior portion of the rod pipe, or they can be formed integral with the rod pipe when the rod pipe is molded. Also, the fishline guide can be formed in any arbitrary shape such as a ring shape, a spiral shape, and the like. This applies similarly to the following inventions.

In the joint type intra-line fishing rod, since the fishline guide is projectingly formed in the interior portion of the large diameter rod pipe, the fishline is prevented from being contacted with the inner surface of the rod pipe to thereby be able to reduce the insertion resistance of the fishline. Also, because the inside diameters of the fishline guides provided in the interior of the large diameter rod pipe are set larger than the outside diameter of the small diameter rod pipe, in a swing-out joint type fishing rod, the small diameter rod pipe can be freely stored deep into the position that is situated backwardly of the fishline guide. In an ordinary joint type fishing rod, the small diameter rod pipe can be stored into the large diameter rod pipe through the rear end thereof with the front end of the small diameter rod pipe inserted at the head.

Also, according to the invention, there is provided a joint type intra-line fishing rod in which the large diameter rod pipe includes a tapered portion having an inside diameter increasing backwardly, a plurality of fishline guides are projectingly provided in the interior portion of said tapered portion, the inside diameters of the plurality of fishline guides are formed larger than the outside diameter of the small diameter rod pipe, and the respective inside diameters are set such that they increase backwardly with substantially the same variation or with a variation smaller than the variation in the taper of the inside diameter of the tapered portion.

In the joint type fishing rod, the large diameter rod pipe includes the tapered portion which increases in the inside diameter thereof in the backward direction, the inside diameters of the fishline guides are set larger than the outside diameter of the small diameter rod pipe, and the respective inside diameters of the fishline guides are formed so as to increase in the backward direction with substantially the same variation or with a variation smaller than the variation in the taper of the inside diameter of the tapered portion. Thanks to this, the more backwardly the fishline guide is situated, the more highly it projects and a plurality of fishline guides are projected as highly as possible, which makes it more difficult for the fishline to be contacted with the inner surface of the rod pipe, thereby contributing to the reduction of the fishline resistance.

Further, according to the invention, there is provided a joint type intra-line fishing rod in which the rear inside portion of the joint portion of the large diameter rod pipe is formed in a steeply tapered shape or in a step-wise shape, a straight or gently tapered large diameter hollow portion is formed further backwardly of the steeply tapered or step-wise portion, a plurality of fishline guides are provided in the large diameter hollow portion in such a manner that they project inwardly, and the inside diameters of the fishline guides are set larger than the outside diameter of the small diameter rod pipe.

In the joint type fishing rod, since the inside of the rear portion of the joint portion of the large diameter rod pipe is formed in a steeply tapered shape or in a step-wise shape, the portion of the joint portion situated backwardly of the steeply tapered or step-wise portion is formed larger than the small diameter rod pipe, so that the small diameter rod pipe can be stored deeply into the backward position of the large diameter rod pipe as well as the fishline resistance can be reduced.

According to the invention, when the joint type fishing rod is a swing-out joint type intra-line fishing rod, there are provided in the interior portion of the large diameter rod pipe a plurality of fishing guides each having an inclined guide portion inclined such that it increases in height backwardly in the axial direction of the large diameter rod pipe, and the inside diameter of the fishline guide situated nearest to the joint portion of the large diameter rod pipe with respect to the small diameter rod pipe is set larger than and substantially equal to the outside diameter of the small diameter rod pipe.

In the joint type fishing rod, since the inside diameter of the first fishline guide nearest to the joint portion with respect to the small diameter rod pipe is larger than and substantially equal to the outside diameter of the joint portion of the small diameter rod pipe, the rear end portion of the small diameter rod pipe separated from the joint portion of the large diameter rod pipe jointed in a swing-out manner is guided and inserted into the inclined guide portion of the front portion of the first fishline guide and, after then, the small diameter rod pipe is supported by the first fishline guide to such a degree that it can be contacted with the respective inclined guide portions of the further backwardly situated fishline guides. That is, due to the respective inclined guide portions, the respective fishline guides can be inserted smoothly and also can be stored in the backward positions smoothly.

BRIEF DESCRIPTION OF THE DRAWINGS

In the accompanying drawings:

FIG. 4 is a section view of the main portions of the fishing rod shown in FIG. 1;

FIG. 9 is a longitudinal section view of the main portions of the fishing rod shown in FIG. 8, showing its storage state;

FIG. 15 is a side view of an intra-line fishing rod according to another embodiment of the invention;

FIG. 16 is a longitudinal section view of the fishing rod shown in FIG. 15, showing its storage condition;

FIG. 25 is a side view of another embodiment of an intra-line fishing rod according to the invention;

FIG. 26 is a longitudinal section view of the main portions of the fishing rod shown in FIG. 25 when the loose fishline guide members are moved;

FIG. 32 is a side view of another embodiment of an intra-line fishing rod according to the invention;

FIG. 36 is a side view of another embodiment of an intra-line fishing rod according to the invention;

DETAILED DESCRIPTION OF THE PREFERRED EMBODIMENTS

Now, description will be given below in more detail of the embodiments of a joint type intra-line fishing rod according to the invention with reference to the accompanying drawings.

Figure 1:
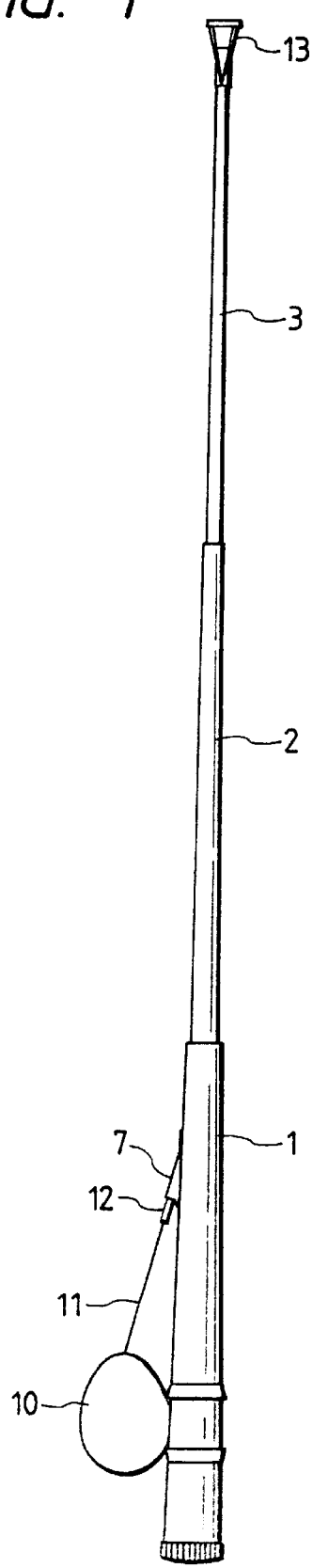
FIG. 1 is a side view of a first embodiment of a joint type intra-line fishing rod according to the invention, showing its using state.
Figure 2:
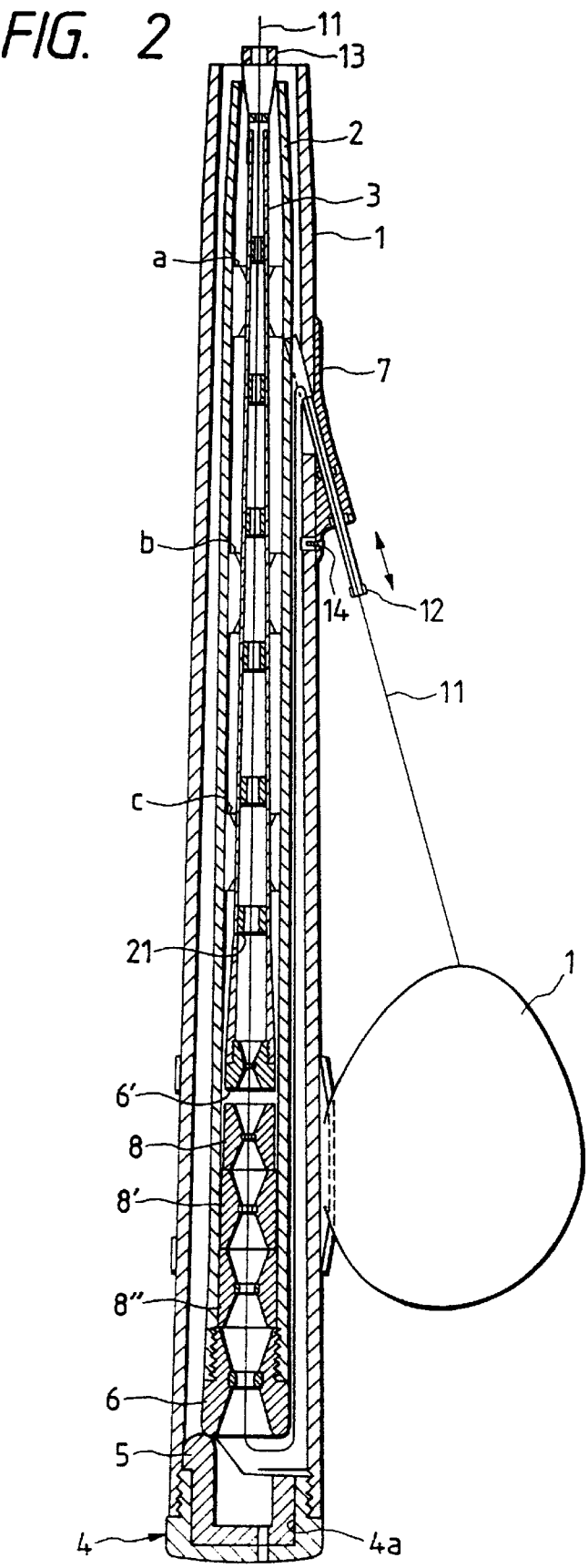
FIG. 2 is a longitudinal section view of the fishing rod shown in FIG. 1, showing its storage state.
Figure 3:
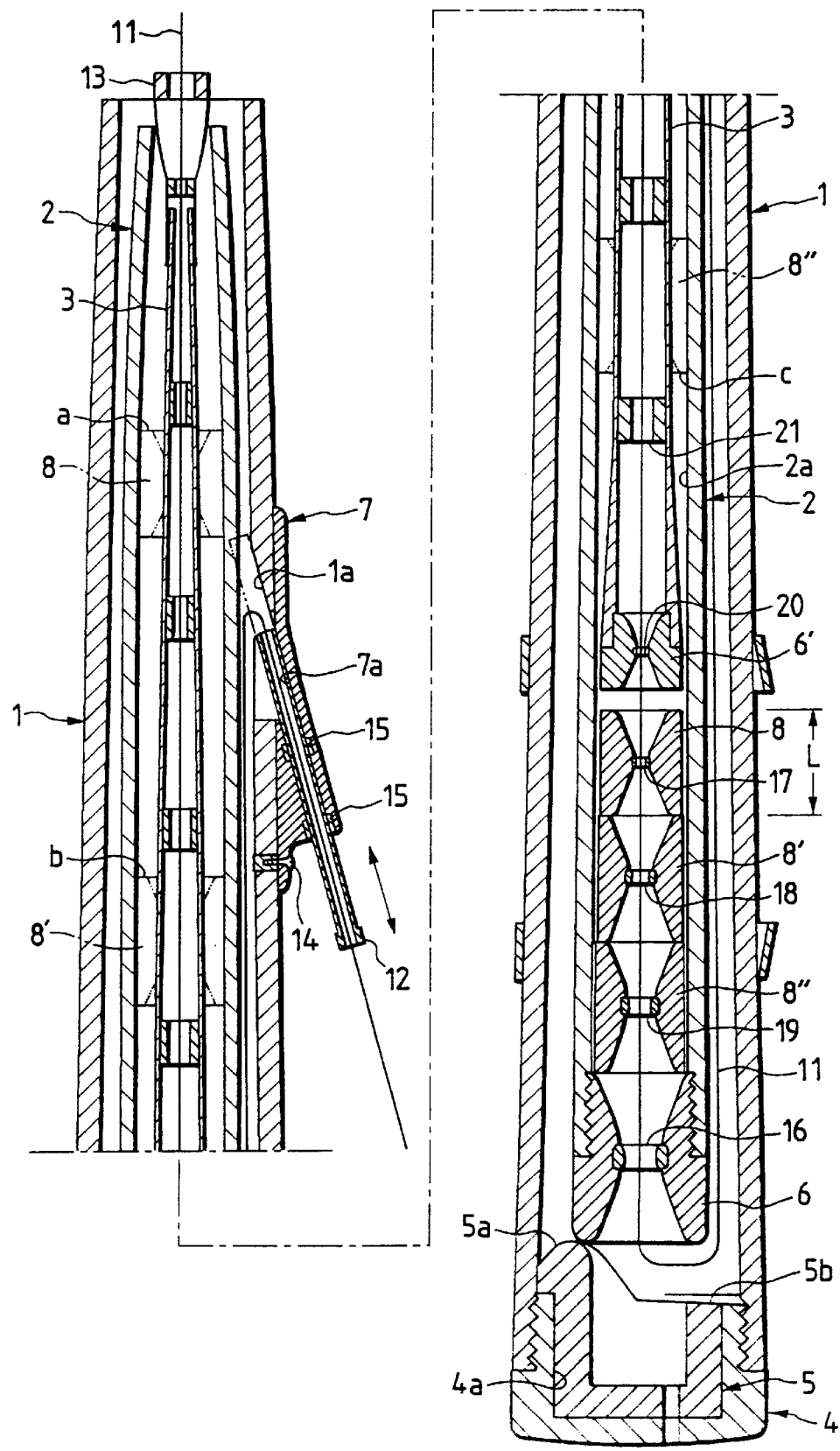
FIG. 3 is an enlarged view of FIG. 2.

In particular, FIG. 1 is a side view of a first embodiment of a joint type intra-line fishing rod according to the invention, showing its using state, FIG. 2 is a longitudinal section view of the fishing rod shown in FIG. 1, showing its storage state, FIG. 3 is an enlarged view of FIG. 2, and FIG. 4 is a longitudinal section view of a middle rod 2 in the fishing rod storage state.

A joint type intra-line fishing rod A according to the present embodiment includes a base rod 1, a middle rod 2, and a top rod 3, in which the rear end joint portion of the middle rod 2 is jointed in a swing-out and telescopic manner with the inside of the tapered joint portion of the leading end portion of the base rod 1 in such a manner that the former can be stored in the latter, and the rear end joint portion of the top rod 3 is jointed in a swing-out and telescopic manner with the inside of the tapered joint portion of the leading end portion of the middle rod 2 in such a manner that the former can be stored in the latter. Here, the middle rod 2 is formed in a tapered manner although it includes a straight portion. A fishline 11 wound around a spool of a reel 10 mounted on the base rod 1, is inserted through a line insertion pipe 12 into the interior of the fishing rod and is drawn out externally from a fishline guide ring 13 of a top guide provided in the leading end of the top rod 3.

To produce the respective rod pipes 1, 2 and 3, prepreg sheets (not shown) respectively cut to tape-shaped rectangular shapes are wound a proper number of times around their respective core metals (not shown), fastening tapes are respectively wound around the prepreg sheets, they are put into a heating furnace and are thermally cured there according to a normal treating method.

The prepreg sheet can be formed, for example, by impregnating a woven cloth, which is reinforced with a high-strength fiber including an organic or inorganic fiber such as a carbon fiber, a glass fiber, an aramide fiber, an alumina fiber, a Kevler fiber, and the like, with thermosetting resin such as epoxy resin, phenol resin, polyester resin and the like. Alternatively, the prepreg sheet or rod pipe can also be formed by use of thermoplastic resin in place of the above-mentioned thermosetting resin.

A bottom plug 4 of a screw type is threadedly engaged with the rear end portion of the base rod 1, while a buffer member 5 formed of rubber is fixed into a recessed portion 4a of the bottom plug 4. The buffer member 5 includes a projecting portion 5a and a cutaway portion 5b and is arranged such that, when the middle rod 2 is stored, a plug member 6 provided in the rear end portion of the middle rod 2 is abutted against the projecting portion 5a and thus the existence of the cutaway portion 5b prevents a fishline 11 from being held by and between the buffer member 5 and plug member 6. The base rod 1 includes an elongated hole 1a, while a fishline introduction guide 7 is mounted into the elongated hole 1a and is fixed to the base rod 1 by a fastening member such as a screw 14 or the like. Also, the fishline introduction guide 7 includes a through hole 7a into which the line insertion pipe 12 is disposed through rubber rings 15 in such a manner that it can be freely advanced and retreated in the longitudinal direction of the through hole 7a. The line insertion pipe 12 is drawn out when the fishing rod is stored, while it is pushed in when the fishing rod is in use. The plug member 6 of the middle rod 2 is formed of metal, synthetic resin or the like and, within the plug member 6, there is fixed a fishline guide ring 16 which is formed of hard material such as metal, ceramics or the like. The front and rear portions of the guide ring 16 are respectively enlarged in diameter toward their respective end portions, as shown in FIG. 3.

Within a hollow portion 2a formed in the inner side of the middle rod 2, there are disposed three loose fishline guide members 8, 8', and 8" which are respectively structured such that they can be held at their given positions in the middle rod 2, their respective holding states can be removed with given forces, and they can be moved backwardly to be stored. With respect to the maximum outside diameter dimensions of the respective loose fishline guide members, the guide member 8" is the largest, the guide member 8' is the second largest, and the guide member 8 is the smallest. The length L of the loose fishline guide member 8 is set larger than the inside diameter dimension of the rear end (the position just before the plug member 6) of the middle rod 2. The lengths of the other two guide members are similarly set. Within the respective loose fishline guide members, there are respectively fixed fishline guide rings 17, 18 and 19 which are respectively formed of hard material such as metal, ceramics or the like, while the front and rear portions of these guide rings are enlarged in diameter toward the respective end portions similarly to the plug member 6. The respective main bodies (guide ring holding portions) of the respective loose fishline guide members are formed of metal, synthetic resin, foam resin, hard cork or the like.

A plug member 6', which is formed of metal or synthetic resin, is fitted with and fixed to the rear end portion of the top rod 3, while a fishline guide ring 20 formed of hard material such as metal, ceramics or the like is fixed into the plug member 6'. The front and rear portions of the fishline guide ring 20 are respectively enlarged in diameter toward the respective end portions thereof, similarly to the above-mentioned plug member 6. Within the top rod 3, there are fixed a plurality of fishline guide rings 21 which are respectively formed of hard material such as metal, ceramics or the like.

In angling, the top rod 3 is drawn out from the middle rod 2. The middle rod 2 is drawn out from the base rod 1, and they are jointed together. During this jointing operation, if the middle rod 2 is moved up and down with the leading end thereof facing downward, then the loose fishline guide members 8, 8', 8" are moved forwardly in the longitudinal direction of the middle rod 2 within the hollow portion 2a of the middle rod 2 and are held at their respective provision positions a, b, c respectively shown by two-dot chained lines in FIGS. 2 and 3, or at their respective given positions shown in FIG. 4.

Figure 8:
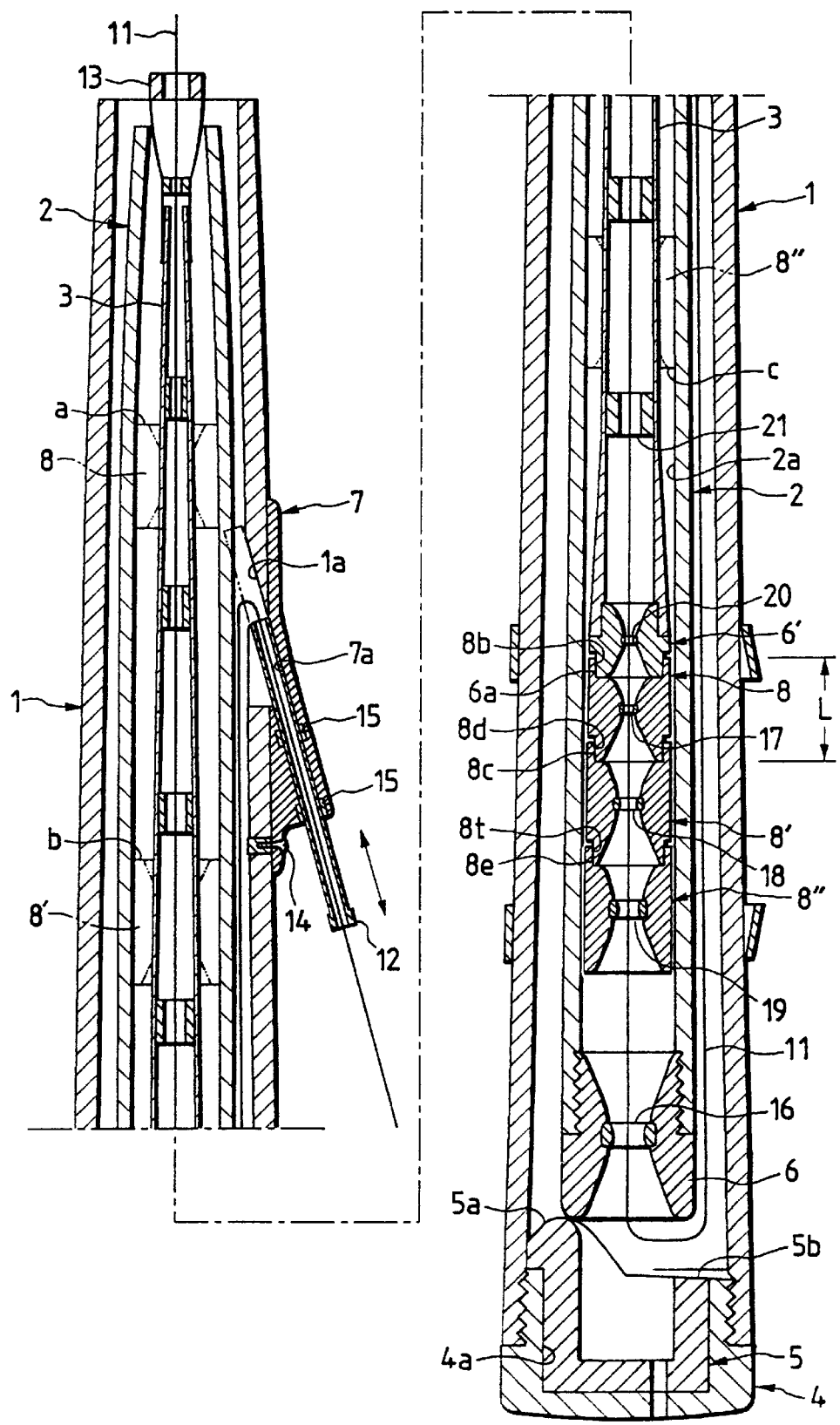
FIG. 8 is a longitudinal section view of another embodiment of a joint type intra-line fishing rod according to the invention, showing its storage state.

In this case, if an angler grips the rear end portion of the base rod 1 or takes out the middle rod 2 from the base rod 1 and holds the rear end portion of the middle rod 2 and then swings the base rod 1 or middle rod 2 to thereby give centrifugal forces to the respective loose fishline guide members 8, 8', 8" and move them forwardly within the middle rod 2 with the aid of the centrifugal forces, then the loose fishline guide members are tightened at their respective positions and can be held there with frictional forces. In the present embodiment, the respective loose fishline guide members 8, 8', 8" in the storage state are not intra-connected to one another but are independently separated from one another (this is different from a state shown in FIG. 8) and, therefore, when they are made to advance with the centrifugal forces, the respective loose fishline guide members can be moved smoothly. However, even when they are connected to one another with small holding forces as shown in FIG. 8, if the centrifugal forces are properly large, then they can be moved smoothly, similarly to the above case. Also, in order to give very large centrifugal forces, the middle rod 2 is drawn out from the base rod 1 and they are jointed together and, after then, the angler holds the rear end portion of the base rod 1 and swings the fishing rod in this jointed state. For this purpose, it is preferred that the storage positions of the loose fishline guide members may be 1 m or more away from the rear end of the base rod 1.

To advance the loose fishline guide members to the respective given positions of the rod pipe by applying centrifugal forces to them or by moving them up and down and to hold them at such given positions is possible not only in a swing-out and telescopic type fishing rod such as the fishing rod according to the present embodiment but also in an ordinary removable joint type fishing rod in which all rod pipes are jointed in an ordinary manner, provided that the loose fishline guide members disposed in the interiors of the respective rod pipes are stored in such a manner that they are separated from one another, because the loose fishline guide members can be moved smoothly and independently from such separate storage manner. Also, in either of the swing-out type fishing rod or the ordinary joint type fishing rod, even when only one loose fishline guide member is provided in the interior of the rod pipe, if the loose fishline guide member is separated from a plug member (such as 6 shown in FIG. 3) provided at the rear end of the rod pipe, or if it is separated from a plug member (such as 6' shown in FIG. 3) disposed at the rear end of a small diameter rod pipe (in FIG. 3, the top rod 3) situated in the forward portion of the fishing rod in the swing-out type fishing rod, the loose fishline guide member can be smoothly moved to and held at its given position by applying a centrifugal force to it or by moving it up and down.

Figure 6:
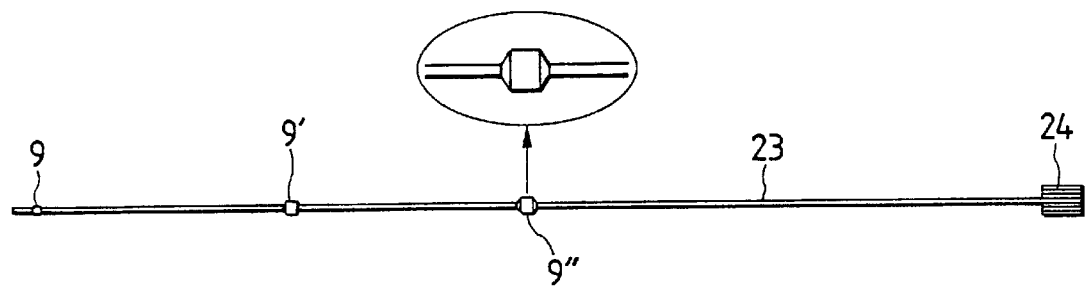
FIG. 6 is a view of a tool which is used to store a loose fishline guide member.

However, even in a structure in which a loose fishline guide member is connected to a plug member at the rear end of a forwardly situated small diameter rod pipe in a swing-out type fishing rod, if a centrifugal force is applied to the loose fishline guide member or a vertical motion is given to the loose fishline guide member after the small diameter rod pipe is drawn out or while the small diameter rod pipe remains connected to the plug member, then the loose fishline guide member can be moved forwardly (together with the small diameter rod pipe) and, when it reaches a position having a given inside diameter, then the loose fishline guide member is prevented against further advancement and is held at such position by a frictional force produced there. In an ordinary joint type fishing rod, to remove the holding of the loose fishline guide member, a given shock force may be given to the rear end of the rod pipe of the fishing rod, or the loose fishline guide member may be pushed or pulled by such a rod-shaped member as shown in FIG. 6 to be discussed later (or, a rod pipe smaller in diameter than a jointed small diameter rod pipe situated just before it).

In the embodiment shown in FIGS. 1 to 4, in storage, if the top rod 3 is pushed into the middle rod 2, then the loose fishline guide members 8, 8', and 8" projected into the interior of the middle rod 2 are moved backwardly by the pushing force and are held at their respective storage positions shown by solid line in FIGS. 2 and 3.

When a joint type fishline is structured in this manner, in fishing, the fishline 11 can be guided smoothly by the loose fishline guide members 8, 8' and 8" which are respectively projected at the given positions of the interior or hollow portion 2a of the middle rod 2, thereby being able to reduce the resistance of the fishline to be produced when the fishline is in contact with the inner surface of the rod pipe. Also, in storage, if the top rod 3 formed as a small diameter rod pipe is stored into the interior 2a of the middle rod 2 formed as a large diameter rod pipe, then the loose fishline guide members can be moved backwardly and, in a state in which the top rod 3 is stored in the middle rod 2, the storage length of the fishing rod becomes shorter and thus the fishing rod is easy to carry or keep. Further, since the fishline guide diameters of the fishline guide rings 17, 18 and 19 respectively disposed in the loose fishline guide members can be set freely regardless of the outside diameter dimension of the small diameter rod pipe, it is possible to set the optimum fishline guide diameter according to the fishline insertion conditions, resulting in a joint type intra-line fishing rod which allows a fishline to be guided smoothly and accurately.

Figure 5:
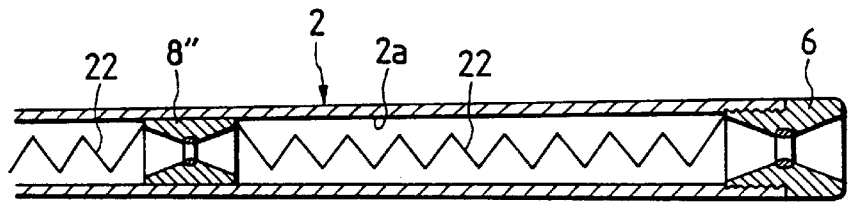
FIG. 5 is a longitudinal section view of another embodiment of a joint type fishing rod with an inserted fishline according to the invention.

Now, FIG. 5 is a section view of a portion of a second embodiment of a fishing rod according to the invention, showing a state thereof in which a loose fishline guide member is energized by a coil spring 22. In this structure, the coil spring 22 is interposed between the plug member 6 of the middle rod 2 and the loose fishline guide member 8", while the loose fishline guide member 8" can be moved smoothly to a given position due to the action of the coil spring 22 and can also be held at the given position. This can also apply similarly to the remaining loose fishline guide members 8, 8'. And, the remaining structures of the second embodiment are similar to those of the first embodiment shown in FIGS. 1 to 4. In addition, the effective diameter of the coil spring 22 in its extended state may be set equal to the inner diameter of the middle rod 2 so that the coil spring 22 can serve similarly as a fishline guide member provided on the inner surface of the middle rod 2.

FIG. 6 is a side view, with a partially enlarged view, of a tool which is used to advance the loose fishline guide members to their respective given positions and hold them at their given positions. This tool includes a wire member 23 to one end of which a knob portion 24 is fixed and also to which three pressure bridges 9, 9', 9" are fixed at given intervals. Each of the pressure bridges includes in the front and rear portions thereof reduced diameter portions which are respectively reduced in diameter toward their respective end portions. The outside diameter of the pressure bridge 9 is smaller than the fishline guide diameters of the guide rings 18 and 19 of the loose fishline guide members 8' and 8" and is larger than the fishline guide diameter of the guide ring 17 of the loose fishline guide member 8. The outside diameter of the pressure bridge 9' is smaller than the fishline guide diameter of the guide ring 19 of the loose fishline guide member 8" and is larger than the fishline guide diameter of the guide ring 18 of the loose fishline guide member 8'.

The outside diameter of the pressure bridge 9" is larger than the fishline guide diameter of the guide ring 19 of the loose fishline guide member 8" and is smaller than the fishline guide diameter of the guide ring 16 of the plug member 6. Therefore, the tool is inserted from the rear end of the middle rod 2, while the loose fishline guide members 8, 8' and 8" are pushed and moved forward by the pressure bridges 9, 9' and 9", respectively, and they are disposed at their respective given positions.

If the respective pressure bridges 9, 9' and 9" are formed of rubber or the like, then they are elastic in their respective longitudinal directions and, therefore, even if there are found some production errors in the inside diameter of the middle rod or in the outside diameters of the loose fishline guide members, the loose fish line guide members can be moved to and held at their respective positions regardless of the production errors. Also, the pressure bridge may be formed of a feather-like material.

Figure 7:
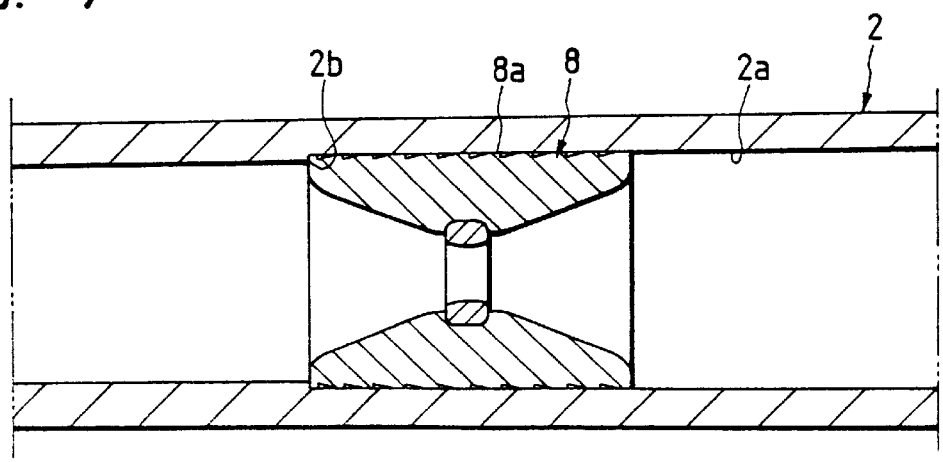
FIG. 7 is a longitudinal section view of another embodiment of a loose fishline guide member and a large diameter rod pipe.

FIG. 7 is a longitudinal section view of modifications of the middle rod 2 and loose fishline guide member. In an inner wall surface forming the inner hollow portion 2a of the middle rod 2, there is formed a stepped portion 2b in correspondence to the provision position of the loose fishline guide member 8, so that the loose fishline guide member 8 is abutted against the stepped portion 2b and is secured there. Similarly, the remaining loose fishline guide members may also be secured by such stepped portions. Securing of the loose fishline guide members by the stepped portions prevents the holding position of the middle rod 2 from going too forwardly, which in turn prevents the middle rod 2 from being broken or damaged due to the too forward holding position thereof.

The loose fishline guide member 8 includes on the outer periphery thereof an uneven portion 8a having a saw-toothed section. Since the uneven portion 8a is inclined gently in the forward direction of the middle rod 2 while it is inclined steeply in the backward direction thereof, the loose fishline guide member 8 is easy to advance but, during the fishing operation, the loose fishline guide member 8 is difficult to be loose in holding and move backwardly, that is, it is difficult to slip off.

Figure 13:
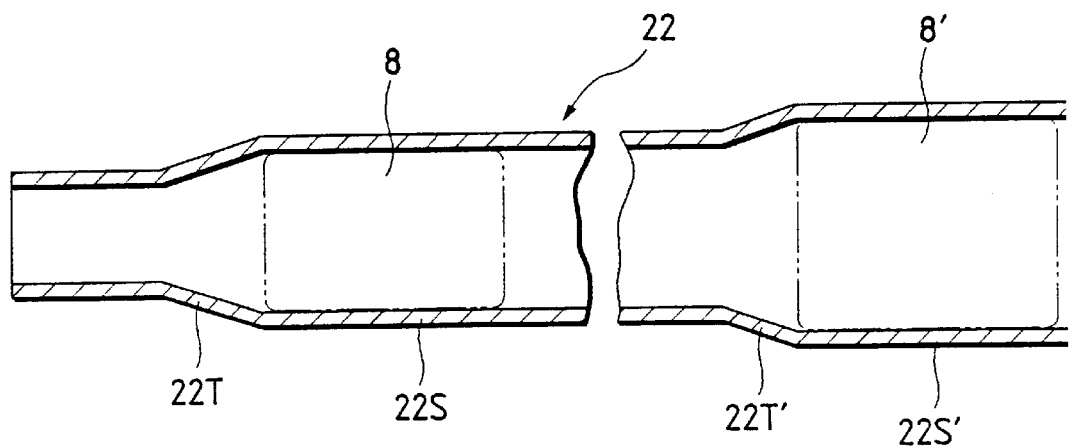
FIG. 13 is a longitudinal section view of the main portions of another embodiment of a fishing rod according to the invention, showing a state thereof in which loose fishline guide members are moved forwardly and held.

Besides the above-mentioned securing of the loose fishline guide members by the stepped portions, as shown in FIG. 13, if the respective loose fishline guide members are secured by the reduced diameter portion of a rod pipe 22 or by the steep taper portions 22T and 22T' of the rod pipe 22 so that they are prevented from moving forwardly too much, and the holding positions of the respective loose fishline guide members are set in the gentle taper portions 22S and 22S' of the rod pipe 22 having a taper of 5/1000 or less, preferably, a taper of 3/1000 or less (including a straight portion), then the holding of the loose fishline guide members is difficult to be loosened.

Further, in the case of the loose fishline guide member 8 including the uneven portion 8a on the side surface thereof, even if the guide member 8 is used in a gently tapered middle rod including no stepped portion, the holding of the guide member 8 can be stabilized.

Now, in FIGS. 8 and 9, there is shown a third embodiment of a fishing rod according to the invention. In particular, FIG. 8 is a longitudinal section view of the fishing rod, showing the storage state thereof, and FIG. 9 is a longitudinal section view of the main portions of the fishing rod, showing the drawn-out or using state thereof.

A plug member 6' provided in the top rod 3 forming a small diameter rod pipe includes a small diameter portion 6a in the rear portion thereof, a loose fishline guide member 8 includes in the front portion thereof a cylindrical portion 8b into which the small diameter portion 6a can be inserted and also to which it can be fitted and secured, the loose fishline guide member 8 includes a small diameter portion 8c in the rear portion thereof, a loose fishline guide member 8' includes in the front portion thereof a cylindrical portion 8d into which the small diameter portion 8c can be inserted and also to which it can be fitted and secured, the loose fishline guide member 8' includes a small diameter portion 8e in the rear portion thereof, and a loose fishline guide member 8" includes in the front portion thereof a cylindrical portion 8f into which the small diameter portion 8e can be inserted and also to which it can be fitted and secured. Therefore, if the top rod 3 is stored into the interior of the middle rod 2, then the loose fishline guide members 8, 8' and 8" are respectively inter-connected to the rear portion of the plug member 6' and thus are suspended down from the top rod 3, as shown in FIG. 8. The remaining structural portions of the third embodiment are similar to those of the first embodiment, while the maximum diameters of the loose fishline guide members are set larger in the order of 8, 8' and 8".

When the top rod 3 formed as a small diameter rod pipe and the middle rod 2 formed as a large diameter rod pipe are drawn out from the fishing rod and are jointed to each other, the loose fishline guide member 8" is firstly caught by the inner wall surface of the tapered middle rod 2 and is held at the caught position, next the loose fishline guide member 8' is caught and held, and finally the loose fishline guide member 8 is caught and held. The given positions a, b and c where the respective loose fishline guide members are held in this manner are shown by solid lines in FIG. 9. If the top rod 3 is stored from the state shown in FIG. 9, then the loose fishline guide members 8, 8' and 8" are fitted with and connected to the plug member 6' in this order.

Alternatively, the respective loose fishline guide members may be formed of magnetic material and magnets may be embedded in the outer portions of the middle rod situated at the provision positions of a, b, c of the loose fishline guide members, so that the loose fishline guide members can be secured by the magnets.

When the respective loose fishline guide members are stored in a mutually connected state as described above, if the connection holding force of the backwardly positioned loose fishline guide member due to the fitting and securing thereof is set smaller than that of the forwardly positioned loose fishline guide member, then the loose fishline guide members can be held at their respective given positions sequentially from the most- backwardly positioned loose fishline guide member. The holding force of the loose fishline guide member can be adjusted by changing the length of the cylindrical portion or small diameter portion. That is, the lengths of the cylindrical portions of the loose fishline guide members are set shorter and thus connection holding forces are gradually reduced as the loose fishline guide members are located backwardly, so that the guide member contacted with the inner surface of the large diameter rod pipe, can be removed easily while the other loose fishline guide member(s) located forwardly there of remain connected together and advance in the connected state.

Also, the connection holding force may be changed by adjusting the inside diameter of the fitting portion. Further, to produce the holding force, an elastic member may be used in the cylindrical portion or small diameter portion, or a slit may be formed in the cylindrical portion or small diameter portion. In addition, in order for an operator to be able to know that the respective loose fishline guide members have been connected to one another in the storage state of the fishing rod, it is preferable to employ such a structure that can give a click sound or a confirming feeling when they are connected together. For example, an annular groove may be formed in one loose fishline guide member while an annular projection may be formed in the other, or an annular stepped portion may be formed in each of the loose fishline guide members, or each of them may be formed in an inversely tapered shape (the initial fitting is tight) in which the fitting becomes looser toward the insertion direction. This allows the operator to know that the storage has been completed, and thus the operator can feel safe.

Figure 10:
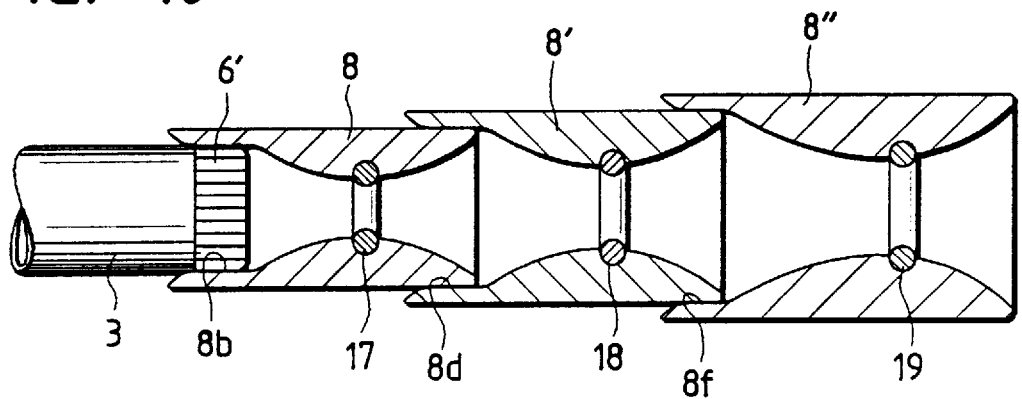
FIG. 10 is a longitudinal section view of the fishing rod shown in FIG. 8, showing a state thereof in which loose fishline guide members are stored.

Now, FIG. 10 is a longitudinal section view of the main portions of the present fishing rod, in which the loose fishline guide members are connected to one another each of which includes no small diameter portion in the rear portion thereof, and the connection holding force thereof is adjusted by changing the fitting length thereof.

Figure 11:
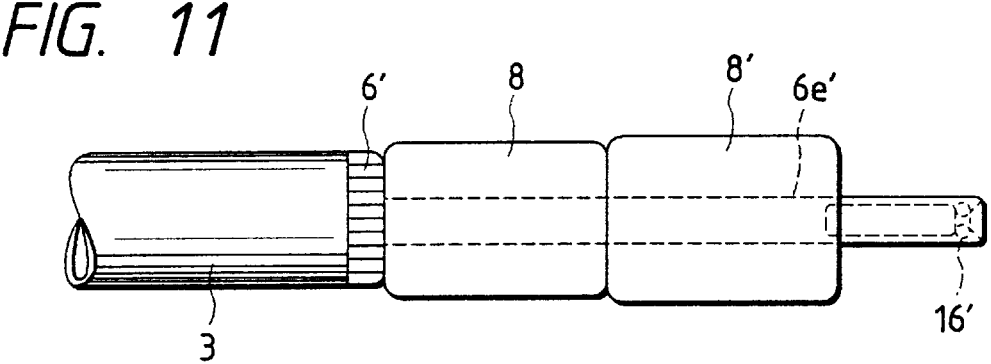
FIG. 11 is a side view of another embodiment of a fishing rod according to the invention, showing a state thereof in which loose fishline guide members are stored.

FIG. 11 is a side view of another embodiment of the small diameter rod 3, in which the plug member 6' provided in the rear end portion of the small diameter rod 3 is extended backwardly to provide an extension portion 6e'. A fishline guide ring 16' formed of hard material such as ceramics or the like is provided in the interior of the rear end portion of the extension portion 6e', while the fishline guide ring 16' is structured such that, even if the fishline is inserted therethrough, the resistance of the fishline can be reduced. The loose fishline guide members 8 and 8' respectively have such fishline guide diameters which allow the extension portion 6e' to be inserted therethrough. Therefore, when the top rod 3 formed as a small diameter rod pipe is stored into a large diameter rod pipe, the extension portion 6e of the plug member 6' provided in the rear end portion of the top rod 3 can be inserted through these two loose fishline guide members and can be stored in the rear portion of the large diameter rod pipe.

The extension portion and the respective loose fishline guide members are fitted with each other in such a manner that the extension portion cannot be slipped off the loose fishline guide members by a force as large as the weight of the loose fishline guide member. Also, actually, the two loose fishline guide members 8 and 8' are separated from each other while they are stored, that is, they are not connected to each other, unlike FIG. 10. However, there arises no problem when the two loose fishline guide members 8 and 8' are secured to each other with such a slight force that, if the backwardly situated loose fishline guide member 8' is pulled backwardly, then only the member 8' can be removed whereas the forwardly situated loose fishline guide member 8 remains held by the extension portion 6e. [0034]

When the thus inserted and stored top rod 3 is drawn out from the large diameter rod pipe, then the backwardly situated loose fishline guide member 8' having a large outside diameter is contacted with the inner wall of the large diameter rod pipe during the draw-out operation, is removed from the extension portion 6e due to the resistance produced between them, and is held at the removed position. After then, similarly, the next loose fishline guide member 8 is contacted with inner wall of the large diameter rod pipe, is removed from the extension portion 6e, and is held at the removed position. In this manner, the loose fishline guide members can be held at their respective given positions by the inner wall of the large diameter rod pipe sequentially, beginning at the most-backwardly situated guide member.

The large diameter rod pipe in this case is a middle rod and, in some cases, there can be provided another middle rod in the rear of the former middle rod. In this case, if the end portion of the extension portion 6e' remains in contact with the front portion of a plug member provided in the rear end portion of the backwardly situated middle rod, then the fishline or line insertion tool can be easily inserted through the middle rod 3 via a fishline introduction guide provided in the base rod regardless of existence of the loose fishline guide members 8 and 8'.

Figure 14:
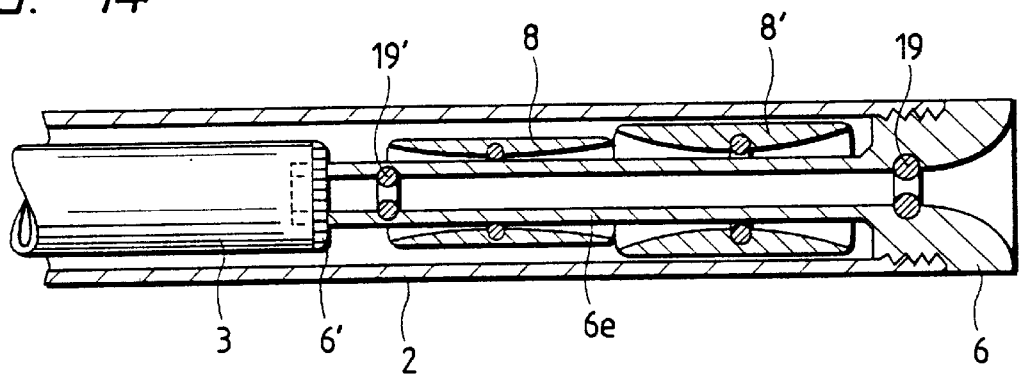
FIG. 14 is a longitudinal section view of the main portions of another embodiment of a fishing rod according to the invention, showing its storage state.

This can similarly apply to a structure shown in FIG. 14. That is, a plug member 6 provided in the rear end portion of the middle rod 2 is extended forwardly to provide an extension portion 6e, the top rod 3 is stored to thereby remove the holding of the loose fishline guide members, and the two loose fishline guide members 8 and 8' are fitted over the extension portion 6e when they are stored. In this case, preferably, there exists no holding force between the extension portion 6e and the loose fishline guide members so that, when the loose fishline guide members are again moved forward to their using positions by means of a centrifugal force or the like, they can be moved forward easily. If the loose fishline guide members are stored in this manner, then the fishline insertion can be achieved only by inserting the fishline or the fishline insertion tool through the plug member 6 provided in the rear end portion of the middle rod 2, regardless of existence of the loose fishline guide members. In this case, more preferably, as shown in FIG. 14, the leading end of the extension portion 6e may be inserted into or contacted with the plug member 6' disposed in the rear end portion of the top rod 3.

Figure 12:
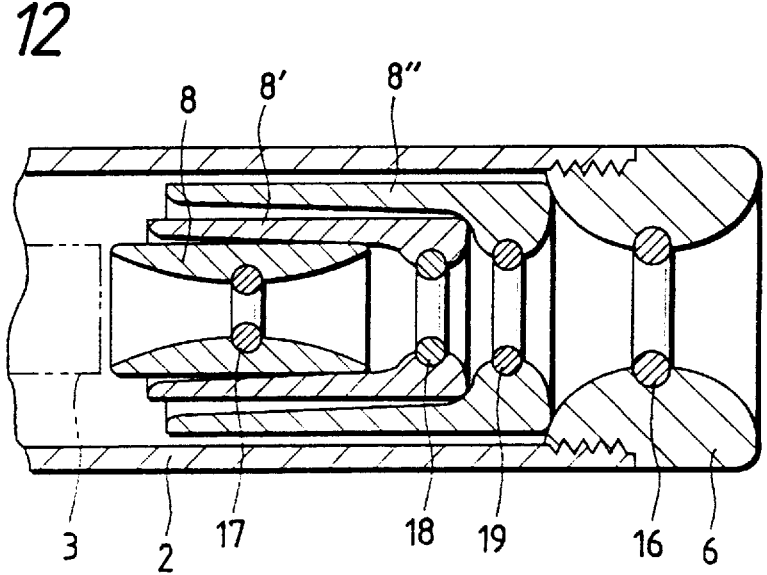
FIG. 12 is a longitudinal section view of another embodiment of a fishing rod according to the invention, showing its storage state.

Now, FIG. 12 shows another embodiment of storage of the loose fishline guide members. In this embodiment, as shown in FIG. 12, three loose fishline guide members 8, 8', and 8" are structured such that the forwardly situated loose fishline guide member is stored deeply in the rearwardly situated loose fishline guide member. The loose fishline guide member 8" having the largest outside diameter is stored deeply until it is contacted with a plug member 6 provided in the rear end portion of the middle rod 2. In this case, depending on the material that is used to form the main bodies of the plug member and loose fishline guide members, in order to prevent the plug member and loose fishline guide members from being damaged when they are contacted with each other, an elastic member may be fixed to at least one of their contact portions. In this manner, if the loose fishline guide members are structured such that the forwardly situated loose fishline guide member is received deeply into the backwardly situated loose fishline guide member mutually, then the top rod 3 formed as a small diameter rod pipe can be stored deeply into the rear portion of the middle rod 2 and thus the storage dimension of the fishing rod can be reduced.

In the above-mentioned embodiments, a single middle rod is employed except for the one specially mentioned case. However, this is not limitative, but there may be used a plurality of middle rods and similar loose fishline guide members may be provided in each of the middle rods. Also, even if the loose fishline guide members are provided in the top rod, they can be moved forward by a centrifugal force or the like and thus can be held properly. In this case, the holding of the loose fishline guide members can be removed by use of a tool or by applying shocks to the rear end of the top rod, or by moving up and down the rear end of the top rod.

As can be seen clearly from the foregoing description, according to the invention, there can be provided a joint type intra-line fishing rod which not only can guide a fishline smoothly but also, when a small diameter rod pipe is stored into the interior of a large diameter rod pipe, can move a loose fishline guide member backwardly to thereby be able to store a small diameter rod pipe deeply into a large diameter rod pipe. Also, there can be provided a joint type intra-line fishing rod fishline which, when there are provided a plurality of loose fishline guide members, can move them easily and smoothly to their respective given positions and can hold them there.

Further embodiments of the present invention will be explained will reference to the drawings.

In FIG. 15, there is shown a swing-out and telescopic type intra-line fishing rod according to the invention. In this fishing rod, a middle rod 112 is jointed to a base rod 110 and a top rod 114 is jointed to the middle rod 112 in a swing-out and telescopic manner. A top guide 116 is mounted on the leading end of the top rod 114. Also, a bottom plug 110S is mounted on the rear end of the base rod 110, a fishline introduction guide 122 is provided in the front portion of the base rod 110, and the base rod 110 includes in the rear portion thereof a reel mounting device 118 to which a double bearing type reel 120 is fixed. A fishline 124 is drawn from the reel 120, passes through the interior of the respective rod pipes via the fishline introduction guide 122, and is drawn out externally from the top guide 116 mounted on the leading end of the top rod 114.

Also, in FIG. 16, there is shown a state in which the present fishing rod is stored. In this storage state, the middle rod 112 is stored in the base rod 110, while the top rod 114 is stored in the middle rod 112. A guide hold member 112A holding a fishline guide ring 112a formed of ceramics is threadedly engaged with the rear end of the middle rod 112. In the extended state shown in FIG. 15, guide hold members 112B, 112C and 112D (which respectively forming loose fishline guide members) holding fishline guide rings 112b, 112c and 112d respectively formed of ceramics are elastically pressed and held at their respective proper positions in the middle portion of the middle rod 112. However, in order to store the top rod 114, the guide hold members 112B, 112C and 112D are respectively pushed out of position by the rear end portion of the top rod 114 and are pushed down to the rear end of the interior of the middle rod 112. A guide hold member 114A holding a fishline guide ring 114a formed of ceramics is in threaded engagement with the rear end of the top rod 114 and, in the proper positions in the middle portion of the top rod 114, there are provided fishline guide rings 114b, 114c, 114d, 114e, 114f and 114g respectively formed of ceramics and fixed to the top rod by use of adhesives or the like.

In the leading end and base root portion of the top guide 116, there are provided fishline guide rings formed of ceramics, respectively. Also, in the bottom plug 110S provided at the rear end of the base rod 110, there is disposed a receive member 126 formed of rubber or the like for receiving the rear end of the middle rod 112. That is, while the receive member 126 receives the rear end of the middle rod 112 in such a manner as shown in FIG. 16, the fishline 124 is changed in direction at the position of the guide hold member 112A, is passed through the fishline introduction guide 122 and is taken up by the reel 120, without being held directly by and between any parts. Further, the fishline introduction guide is structured such that a pipe member 122B can be held by a hold member 122A, and the pipe member 122B can be slid within a hole formed in the hold member 22A in the axial direction thereof and also can be held at an arbitrary position, while the pipe member 122B includes ceramics in the inner surface thereof to thereby allow the fishline 124 to move smoothly therethrough.

Figure 17:
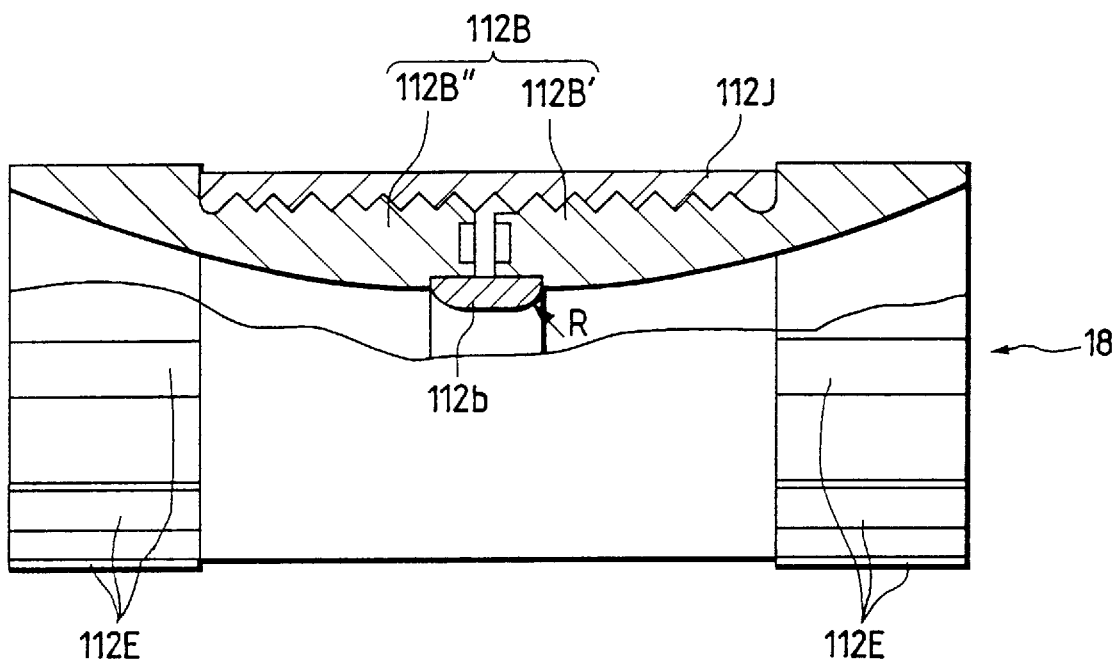
FIG. 17 is a partially longitudinal section view of a loose fishline guide member employed in the intra-line fishing rod according to the invention.
Figure 18:
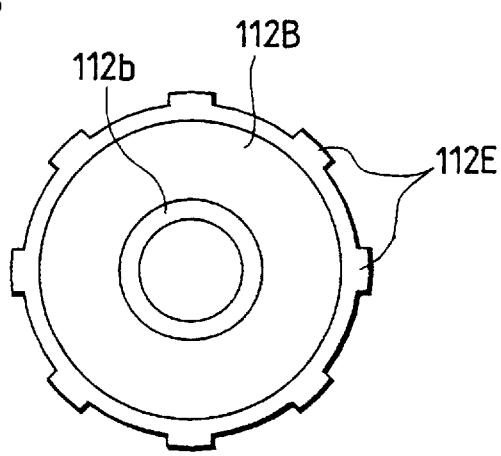
FIG. 18 is an end view as viewed in a direction indicated by the arrow line 18 shown in FIG. 17.

As an example, in FIG. 17, there is shown the structure of a loose fishline guide member which includes the fishline guide ring 112b and has a straight shape with the front and rear portions thereof being substantially equal in outside diameter to each other. FIG. 18 is an end view of the present loose fishline guide member as viewed in a direction of the arrow line 18 shown in FIG. 17. The remaining fishline guide members respectively holding the fishline guide rings 112c and 112d are also similar in structure to the illustrated one. Now, the fishline guide ring 112b is formed wide and thin in section, and the portion R of the two edge portions of the fishline guide ring 112b except for the portion thereof embedded in the guide hold member 112B is formed in a curved surface, so that the fishline is allowed to pass easily therethrough. A cylindrical member 112J formed of stainless steel serving as a weight member having large specific gravity includes on the inner surface thereof female threads which are in threaded engagement with relatively soft guide hold parts 112B', and 112B" respectively formed of synthetic resin. The guide hold parts 112B' and 112B" respectively have such longitudinal sections as shown in FIG. 17, while the guide hold member 112B holds the fishline guide ring 112b at the central position thereof where the inside diameter of the guide hold member 112B made up of the two guide hold parts combined together is the smallest. Due to this, the fishline 124 can be guided smoothly.

In view of the smooth movement of the loose fishline guide member toward the front portion of the rod pipe, the loose fishline guide member including the cylindrical member 112J formed of stainless steel having large specific gravity is advantageous in that it can be easily moved forward by a fishing rod swinging operation. Also, in the outer peripheries of the two end portions of the guide hold member 112B, there are formed projecting strips 112E which respectively extend in the longitudinal direction of the guide hold member 112B, while the outside diameter of the cylindrical member 112J is set equal to or smaller than the outside diameter of the recessed portion formed in the outer periphery of the end portion of the guide hold member 112B as a consequence of provision of the projecting strips 12E. Since the cylindrical member 112J is heavy, the quantity of motion of the loose fishline guide member is large when it is moved forwardly, so that the projecting strips 112E on the outer periphery of the end portion of the soft guide hold member 112B formed of synthetic resin can be elastically pressure contacted with the inner wall surface of the middle rod 112 and can be held at their respective given positions of the middle rod 112 with a proper force. Further, as described above, since the outside diameter of the cylindrical member 112J is set equal to or smaller than the outside diameter of the recessed portion on the outer periphery of the end portion of the guide hold member 112B, there exists a clearance between the cylindrical member 112J and the inner wall surface of the middle rod 112 and thus, if the loose fishline guide member is pushed by the rear end portion of the top rod 114, then it can be easily removed from its holding state even if the inner wall surface of the middle rod 112 is wet with water, without being attracted through the water.

The stainless steel used for the above-mentioned weight member is just an example. Preferably, as the result that a weight member is used in the loose fishline guide member, the specific gravity of the whole of the loose fishline guide member is about 102–108 and the loose fishline guide member is difficult to rust. Metal such as copper, titanium, bronze, brass or the like, or ceramics can be used as the weight member. The metal or ceramics formed into a given size and provided in the loose fishline guide member as the weight member, can move the loose fishline guide member forwardly of the fishing rod simply by swinging the fishing rod slightly. However, it is not preferable to use a weight member which is too heavy, because the excessively heavy weight member increases the weight of the fishing rod. Also, it is preferable that the loose fishline guide member can be smoothly moved forward within the rod pipe and, for this purpose, it is preferable that the length of the loose fishline guide member may be set greater than the outside diameter dimension thereof.

Figure 19A:
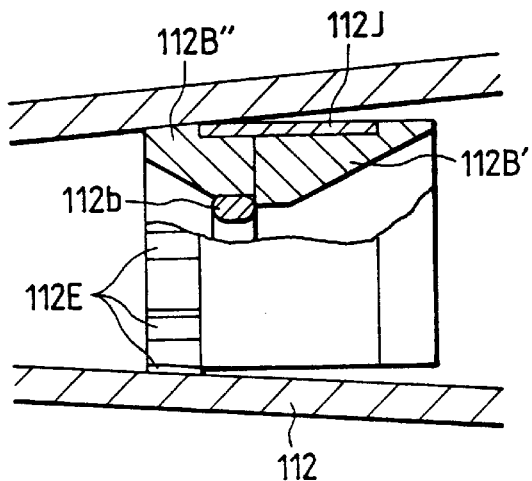
FIGS. 19A to 19C are partially longitudinal section views of loose fishline guide members according to the invention.

In the straight area of the interior of the middle rod 112, the two end portions of the loose fishline guide member are in pressure contact with the inner wall surface of the middle rod 112, whereas in the tapered area thereof only the front end portion of the loose fishline guide member is in pressure contact with the middle rod inner wall surface. Besides the above embodiment, there are possible some modifications. For example, in a modification shown in FIG. 19A, the middle rod 112 is formed in a tapered shape, while the loose fishline guide member includes a tapered front end portion having a plurality of projecting strips 112E formed therein and the diameter dimension of the whole loose fishline guide member is formed substantially straight. Due to this structure, as mentioned above, only the front end portion of the loose fishline guide member is in pressure contact with the middle rod inner wall surface. Therefore, there is no need to provide projecting strips portion in the rear end portion of the loose fishline guide member.

Figure 19B:
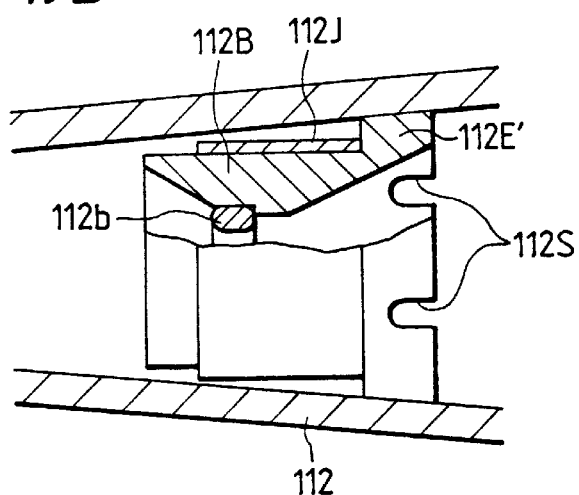

In another modification shown in FIG. 19B in order that the rear end portion of the loose fishline guide member can be pressure contacted with the middle rod inner wall surface, the front portion of the loose fishline guide member is formed such that the diameter thereof is reduced. There are formed slits 112S in the rear end portion of the loose fishline guide member and, due to the action of the slits 112S, the rear end portion of the loose fishline guide member is allowed to have elasticity and thus it can be elastically held against the inner wall surface of the middle rod 112. In the modification shown in FIG. 19B, the front portion of the loose fishline guide member is reduced in diameter and, therefore, when compared with the modification shown in FIG. 19A, the loose fishline guide member can be moved forwardly with ease when holding it and is difficult to be removed backwardly while it is held in pressure contact. Also, since the loose fishline guide member is held due to its elasticity, while it is stored, if it is pushed by the rear end portion of the top rod 114, then it can be removed easily. Such elasticity can be provided not only by forming the above-mentioned slits and projecting strips but also by forming thin the holding portion of the loose fishline guide member such as the end portion thereof or the like or by using a spring such as a plate spring or the like.

Figure 19C:
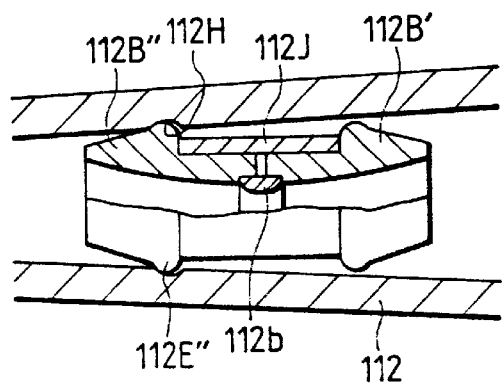

In a modification shown in FIG. 19C, there is formed in the inner wall surface of the middle rod 112 a recess 12H which is annular and has a shallow curved surface in section, while there is formed in the front end portion of the loose fishline guide member a projection 112E" with a curved surface which can be secured to the recessed portion 112H, and also in the guide member front end portion, there is formed a rather deep slit extending in the longitudinal direction of the front end portion. In this modification, when the loose fishline guide member is moved forwardly along the inner wall surface of the middle rod 112 by swinging the fishing rod, it can be moved forwardly while it can be elastically reduced in diameter and, if the projection 112E" is situated at the recessed portion 12H, then the projection 12E" can be increased in diameter due to its elasticity and can be thus secured to the recessed portion 12H. Since the recessed portion 12H and projection 12E" are both formed in a curved surface, in this modification as well, if the loose fishline guide member is pushed by the rear end portion of the top rod or the like, then its holding state can be removed easily.

Figure 20:
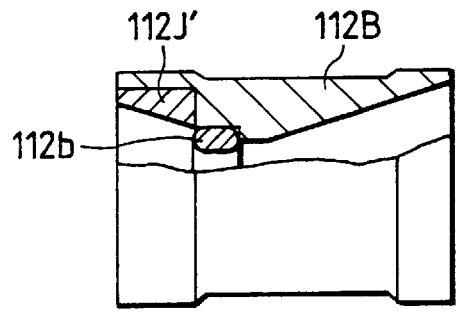
FIG. 20 is a partially longitudinal section view of still another embodiment of a loose fishline guide member.

Now, in FIG. 20, there is shown another embodiment of the loose fishline guide member according to the invention. In this embodiment, a fishline guide ring 112b formed of ceramics is held by a guide hold member 112B formed of synthetic resin and also a weight member 112J' formed of lead or the like is mounted to the guide hold member 112B. In view of the fact that the loose fishline guide member can be moved smoothly to the front portion of the rod pipe, it is advantageous to mount the weight member at a front side position, when compared with a case in which it is mounted at a rear side position. Alternatively, the fishline guide ring 112b formed of ceramics may be formed in a larger size so as to serve also as a weight member.

While the above-mentioned loose fishline guide member is moved when it is to be removed from the inner wall surface of the rod pipe or when it is to be held and mounted at its given position in the rod pipe, a clearance to prevent the loose fishline guide member from being attracted through water can be secured by forming on the surface of the loose fishline guide member such recessed strip and projecting strip as shown in FIG. 17 which extends in the longitudinal direction of the loose fishline guide member, or may be secured by forming on the surface of the loose fishline guide member annular recessed strips and projecting strips extending in the circumferential direction of the loose fishline guide member, or by forming recessed strips and projecting strips extending in the oblique direction thereof. The latter examples are shown in FIGS. 21, 22 and 23, respectively.

Figure 21:
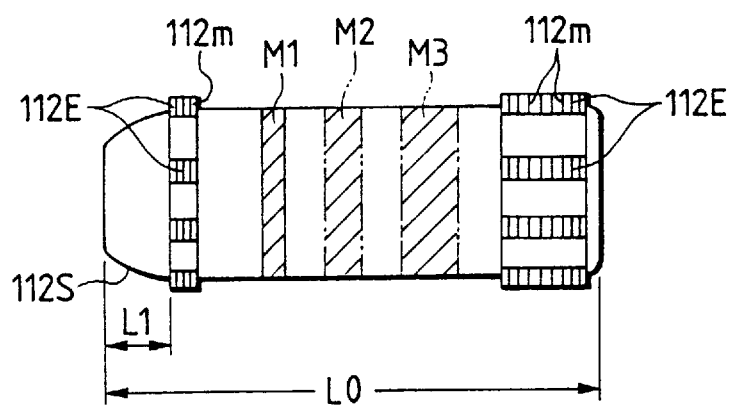
FIG. 21 is a side view of another embodiment of a loose fishline guide member.

In FIG. 21, in both of the front and rear portions of the loose fishline guide member, there are respectively disposed in the circumferential direction of the loose fishline guide member a plurality of projecting strips 112E which extend in the longitudinal direction of the loose fishline guide member and are spaced apart from each other. Also, in this embodiment, a plurality of fine grooves 112m are formed on each of the projecting strips 112E in such a manner that they extend in the circumferential direction of the loose fishline guide member. Due to this structure, water can be drained not only in the circumferential direction of the loose fishline guide member but also in the longitudinal direction thereof, thereby being able to prevent the loose fishline guide member from being attracted through by water more effectively than the above-mentioned embodiments.

Figure 22:
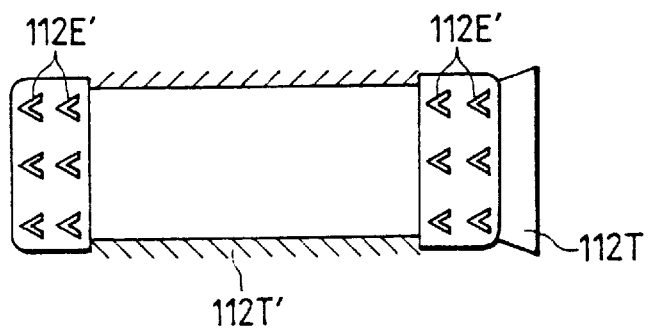
FIG. 22 is a side view of another embodiment of a loose fishline guide member.

In FIG. 22, instead of the above-mentioned projecting strips, there are disposed a plurality of V-shaped projecting portions 112E' on both of the front and rear portions of the loose fishline guide member, while the respective projecting portions 112E' are spaced apart from one another in the circumferential direction of the guide member as well. Therefore, in this structure, the water which hinders the removal of the loose fishline guide member can be drained between the respective projecting portions in the circumferential direction as well as in the longitudinal direction of the guide member, so that the loose fishline guide member can be moved smoothly. More preferably, besides this, there may be formed on the surface of each of the V-shaped projecting portions 112E' a large number of fine grooves similar to those shown in FIG. 21 and extending in the circumferential direction of the loose fishline guide member.

Figure 23:
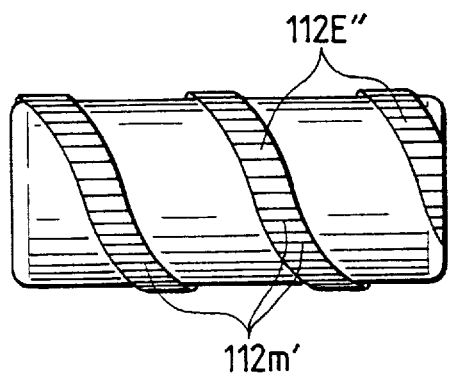
FIG. 23 is a side view of another embodiment of a loose fishline guide member.

In FIG. 23, there are formed a plurality of spiral-shaped projecting strips 112E" on the surface of the loose fishline guide member. Each of the projecting strips 112E" includes on the surface thereof a large number of fine grooves 112m' which extend in the longitudinal direction of loose fishline guide member. Therefore, when removing the loose fishline guide member, the water which provides an attraction factor can be drained not only in the circumferential direction of the loose fishline guide member but also in the longitudinal direction thereof, so that the loose fishline can be moved smoothly. Such spiral-shaped projecting strips 112E" can also be formed by winding a fishline or securing a fishline. Also, if spiral-shaped fishline guides are provided inside the loose fish guide member, the strips 112E" are preferably formed at radially corresponding positions along the guides. Although this will be described later in detail with reference to FIG. 34, when the spiral-shaped projecting strips are pressed against the inner surface of the rod pipe, the fishline guides is provided on the inner surface side can enhance the loose fishline guide member the rigidity of thereby preventing the loose fishline guide member from being loosened during fishing.

Referring again to FIG. 21, when a plurality of loose fishline guide members are used, since the rod pipe is generally formed in a tapered shape, the loose fishline guide members vary slightly in size from one another. Therefore, if they are removed and inserted before and after they are cared for, then the wrong order or direction thereof can be selected so that they cannot be held within the rod pipe. To avoid this, preferably, a mark showing the insertion direction and insertion order may be put on the surface of each of the loose fishline guide members. In FIG. 21, the insertion order is specified by putting annular patterns M1, M2, and M3 on the surfaces of the loose fishline guide members. For example, it should be previously defined that only the pattern M1 shows the first one, the patterns M1 and M2 show the second one and the patterns M1, M2 and M3 show the third one. And, with respect to the insertion direction, the side of the loose fishline guide member where the pattern M1 exists should be inserted first. Also, Arabic numerals may be put on the surfaces of the loose fishline guide members. In this case, for example, the order of the loose fishline guide members can be decided according to the order of these numerals and the insertion direction thereof can be determined according to the direction of the numerals. Further, the V-shaped projecting portion 12' shown in FIG. 22 can also be used as a pattern which specifies the insertion direction.

In order to advance smoothly the loose fishline guide in the rod pipe from its storage condition and hold it at a given position, preferably, the front portion (head portion) of the loose fishline guide member may be formed in a curved surface like 12S shown in FIG. 21 or in a tapered shape so that the front portion can be prevented from being hitched on the interior of the rod pipe. Also, if the length L1 of the head portion is set less than ⅓ of the whole length L0, then the head portion is prevented from being inclined and leaned when the loose fishline guide member is advanced, so that the loose fishline guide member can be advanced smoothly within the rod pipe. Also, for the smooth advance of the loose fishline guide member, preferably, the absolute length L1 of the head portion may be 3 mm or longer.

Further, if the weight of the loose fishline guide member is distributed unevenly heavily to the head portion or at least the front half section of the loose fishline guide member, then the loose fishline guide member is able to advance smoothly since the head portion thereof is not inclined or leaned. Preferably, a member having specific gravity of 5 or greater is disposed in the head portion or the front half section of the loose fishline guide member. Alternatively, for the unevenly distributed weight, the weight of the fishline guide disposed at a certain position in the front half section of the loose fishline guide member may be set heavy. Also, for the smooth advancing movement of the loose fishline guide member, the weight of the loose fishline guide member may be set not only less than the value (gram) of the inside diameter (mm) of the rod pipe at a position where the loose fishline guide member is held but also at least 2 grams or more.

Also, as shown in FIG. 22, if skirt-like guide means 112T is provided in the rear end portion of the loose fishline guide member, then the loose fishline guide member is able to advance smoothly within the rod pipe. That is, even if the whole length of the loose fishline guide member is short, the guide means 112T prevents the loose fishline guide member from being reversed within the rod pipe and allows the loose fishline guide member to advance smoothly within the rod pipe. The fact that the loose fishline guide member is difficult to be reversed is also effective when the loose fishline guide member is stored in the rear portion of the rod pipe after it is used, that is, the stored condition of the loose fishline guide member can be easily stabilized as well as the loose fishline guide member can be stored at a given position. Further, when inserting the fishline, the fishline is guided by the inner surface of the guide means 112T so that the fishline insertion can be achieved easily.

The skirt-like guide means 112T may be formed of sponge, or feathers which are used in the shuttlecock of a badminton, or may be formed by arranging linear members or beard-like members in a skirt shape. Besides, transplanted hairs (minute beards) 112T' may be provided on the side surface of the loose fishline guide member as shown in FIG. 22 instead of the skirt-like guide means 112T, or both of them may be provided. If the transplanted hairs 112T' are provided, then the hairs 112T' are also useful in preventing the loosening (moving) of the loose fishline guide member that is held at a given position within the rod pipe.

The holding of the loose fishline guide member within the rod pipe increases the rigidity of the rod pipe accordingly, while the flexibility of the rod pipe is lowered. This tendency can be increased further especially when a long loose fishline guide member is used. In order to avoid the lowered flexibility of the rod pipe, the guide hold member (112B or the like) that holds the fishline guide ring 112b may be formed of material such as rubber, elastomer resin or the like which is lower in elastic module than the rod pipe, and also may be formed as thin as possible, so that the low rigidity can be realized.

Besides, the surfaces of the projecting strips and projecting portions to be pressure contacted with the inner surface of the rod pipe may be covered with rubber such as urethane rubber or elastic material such as a foaming tube (contractible tube) (in the case of the tube, the surface thereof can also be roughened). Or, elastic material such as rubber-system paint, foaming paint or the like (in the case of the foaming paint, a roughened surface can also be obtained) may be fixed to or coated on the surfaces of the projecting strips partially or entirely in a large number of points or in any of other proper shapes.

Moreover, if strips and recessed are formed in the inner surface of the rod pipe substantially along the longitudinal direction thereof to thereby make the rod pipe slightly elastic, then the loose fishline guide member can be held elastically. Or, if the surfaces of the projecting strips or the inner surface of the rod pipe having no such strips therein are coated with the above-mentioned elastic material, then the loose fishline guide member can be held elastically. That is to say, the elastic pressure contact can be achieved even when the loose fishline guide member includes no elastic portion.

Especially, in order to facilitate the advancing movement of the loose fishline guide member from the rear portion of the interior of the rod pipe in the casting operation, the surface of the loose fishline guide member may be coated with a film which can provide a good slidability, or a guide hold member formed of silicone resin may be used, or the front portion (such as only the head portion or the like) of the loose fishline guide member may be formed in a well sliding form. If the front portion of the loose fishline guide member is formed easy to slide and the rear portion thereof is formed so as to have a rather large friction coefficient, then the loose fishline guide member is easy to move forwardly and, after it is held and secured once, it is difficult to be removed backwardly. Further, when the loose fishline guide member is advanced with a large throwing force such as a casting force, in order that the air resistance of the loose fishline guide member within the rod pipe is reduced to thereby move it forward smoothly, there may be formed in the loose fishline guide member a groove or a dimple which can cut the air.

The rod pipe is generally formed in a tapered shape, and thus the loose fishline guide member that is retreated to and stored in the rear portion of the rod pipe has a large clearance with respect to the rear portion of the rod pipe in the radial direction thereof because the inside diameter of the rear portion of the rod pipe is large. Therefore, if the loose fishline guide member is too short in length, then the loose fishline guide member is easy to be inclined and thus cannot be advanced smoothly when it must be moved forwardly. To avoid this, the lengths of the loose fishline guide members are set longer than the rear end inside diameter dimensions of the rod pipe in which they are stored respectively. Generally, a guide hold member (such as 12A or the like) holding a fishline guide ring is mounted in the rear end of the rod pipe and, in this case, the rear end inside diameter is the diameter of the portion just before the guide hold member. Similarly, even when the rod pipe includes a straight area, it is preferable that the loose fishline guide member may be formed longer than the inside diameter of the rear end of the rod pipe.

Figure 24:
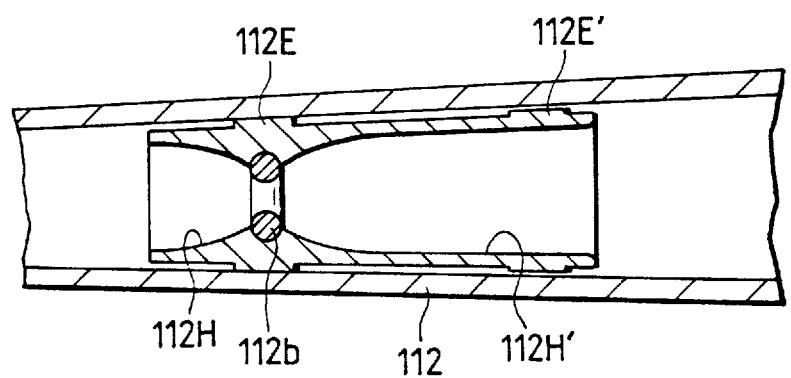
FIG. 24 is a longitudinal section view of another embodiment of a loose fishline guide member.

Now, in FIG. 24, there is shown another embodiment of a loose fishline guide member. In this embodiment, a fishline guide ring 112b is mounted inside the position of a projecting strip portion 112E which can be pressed against the inner surface of the rod pipe 112. Therefore, even when the projecting strip portion 112E is pressed against the inner surface of the rod pipe, the pressure contact portion is reinforced due to the existence of the fishline guide ring 112b disposed inside the strip portion 112E, so that the loose fishline guide member is difficult to be loosened during the fishing operation. Also, as in the present embodiment, if the fishline guide ring 112b is positioned in the front portion of the loose fishline guide member, then, as previously described, the front portion of the loose fishline guide member is heavier in weight, which allows the loose fishline guide member to be moved forward smoothly. If the front and rear projecting strip portions 112E and 112E' are pressed against the inner surface of the rod pipe, or if the whole circumferential surface of the guide hold member is pressed against the inner surface of the rod pipe, the fishline guide ring 112b may be positioned in the neighborhood of the central portion of the loose fishline guide member. However, from the viewpoint that the front portion of the loose fishline guide member is made heavy, it is preferable that the fishline guide ring 112b may be positioned to the front portion of the loose fishline guide member.

The fishline guide ring 112b, which is formed of ceramics such as silicon carbide or the like, projects most deeply inside the loose fishline guide member, while the front and rear inner surfaces 112H and 112H' of the loose fishline guide member are gradually increased in diameter toward their respective end portions of the loose fishline guide member (although each of them may include a straight portion in part). When the fishline is inserted into the rod pipe, the fishline passed through the loose fishline guide member from the end portion thereof. Therefore, since the end portion of the loose fishline guide member is wide, the fishline insertion can be facilitated. This improved fishline insertion can be provided similarly in the embodiment shown in FIG. 17 as well.

In the foregoing description, the loose fishline guide member is provided only in the middle rod 112. However, this is not limitative, but the fishline may be provided in the top rod 114 to thereby facilitate the maintenance of the fishing rod such as cleaning or similar operations.

Referring to the loose fishline guide member that is mounted inside the rod pipe, the following objects 1–3 can be achieved by the following structures:

1. To facilitate the sure holding of the loose fishline guide member at a given position.
2. To facilitate the movement of the loose fishline guide member in the longitudinal direction of the rod pipe after the holding state of the loose fishline guide member is removed.
3. To prevent the loose fishline guide member from breaking the rod pipe when the loose fishline guide member is held or is moved.

If the area of the loose fishline guide member that can be pressed against the inner wall of the rod pipe is formed so as to be interrupted at least in the circumferential direction or axial direction, then the object (2) can be attained.

If at least part of the contact portion of the loose fishline guide member with the inner wall of the rod pipe is formed of rubber or synthetic resin and a member formed of material larger in specific gravity than the above rubber or synthetic resin is provided in the loose fishline guide member, then the objects (1) and (2) can be achieved.

If a plurality of loose fishline guide members are held and disposed at intervals within the rod pipe and marks each showing at least an insertion order or insertion direction are put on the surfaces of the respective loose fishline guide members, then the objects (1), (2) and (3) can be accomplished.

If the whole length of the loose fishline guide member disposed in the rod pipe inside hollow portion formed in a tapered shape allowing for a straight portion is set longer than the rear end inside diameter dimension of the rod pipe in which the loose fishline guide member is disposed, then the objects (2) and (3) can be attained.

As can be seen clearly from the foregoing description, according to the invention, since the loose fishline guide member is held elastically, the rod pipe is difficult to be broken, and, even if the fishing rod is flexed during the fishing operation, the fishline guide is difficult to be removed but, as the need arises, it can be removed easily by pushing or pulling it in the longitudinal direction of the fishing rod.

FIG. 25 shows another embodiment of an intra-line fishing rod according to the invention and, in particular, to a casting rod. The casting rod is formed of a single rod but, however, for convenience of explanation, the casting rod is divided into a top rod part 210A situated in the leading portion of the casting rod, a middle rod part 210B situated in front of a large diameter part 226, and a rear rod pipe part 210C situated in the rear of the large diameter part 226. The top rod part 210A, middle rod part 210B, large diameter part 226, and rear rod pipe part 210C are formed of fiber reinforced prepreg into a united body. However, alternatively, they may be firstly formed as separate rod pipes and, after then, may be connected together by adhesion or the like.

The rear rod pipe part 210C extends up to a rear grip 220B, while the rearmost end portion of the rear rod pipe part 210C is a rod bottom 222. In front of the rear grip 220B, there is formed a trigger 225 which projects downwardly, the upper portion of the trigger 225 provides a reel placement portion on which a double bearing type reel 16 can be placed, and, in front of the trigger 225, there is formed a rotatable front grip 20A which is used to fix the legs of the reel 216. Reference character 14 designates a reel fixing device which includes the above-mentioned mechanisms. In front of the reel fixing device 214 and at the position of the large diameter part 226, there is formed a fishline introduction portion 224. Further, in the front end of the top rod part 210A, there is mounted a top guide 212 which includes therein a guide ring formed of ceramics. In the present embodiment, there is mounted the double bearing type reel 216 and is provided with a trigger. However, this is not limitative but, alternatively, the trigger may be omitted and the spinning reel may be mounted on a cylindrical reel fixing device.

In the present embodiment, as shown in FIG. 25, the rod pipe part thereof is formed in a linear shape but, however, the following operation and effect of the present embodiment can also be obtained similarly even in a fishing rod which is structured such that the portion (210C) of the rod pipe situated in the rear of the fishline introduction portion is shifted from the portion (210B) of the rod pipe that is situated in front of the fishline introduction portion.

The interior of the top rod part 210A is formed in a tapered shape having a taper angle larger than that of the interior of the middle rod part 210B. The interior of the middle rod part 210B is tapered having a small taper angle (for example, a taper angle of $3/1000$ or less), and three loose fishline guide members 230A, 230B and 230C are disposed and held at given positions in the interior of the middle part 210B (however, alternatively, a single loose fishline guide member may be used). In the interiors of the respective loose fishline guide members, as shown in FIG. 26, there are disposed guide rings G which are formed of hard material such as ceramics or the like. Due to this, the present embodiment provides an intra-line fishing rod which can reduce the insertion resistance of a fishline 218 and thus allows the fishline 218 to be inserted smoothly.

In the top rod part 210A, no loose fishline guide member is provided because the inside diameter of the top rod part 210A is small. However, for example, a spirally-shaped fishline guide may be provided on the inner surface of the top rod part 210A in a projecting manner and may be used to contribute to the reduction in the fishline insertion resistance. The reason why the taper angle of the top rod part 210A is set rather large is to improve the flexibility of the top portion thereof. Also, due to the fact that the taper angle of the interior of the middle rod part 210B is set small, while a fishing operation is being executed in such a manner that the loose fishline guide members are being held at their respective given positions, the holding of the loose fishline guide members can be prevented from being loosened. The interior of the rear rod pipe part 210C is also formed tapered. However, the connecting portion between the middle rod part 210B and the rear rod pipe part 210C is the above-mentioned large diameter part 226 and thus both of the inside and outside diameters of the connecting portion are larger than those of the portions of the two rod pipe parts situated before and behind the connecting portion.

Figure 27:
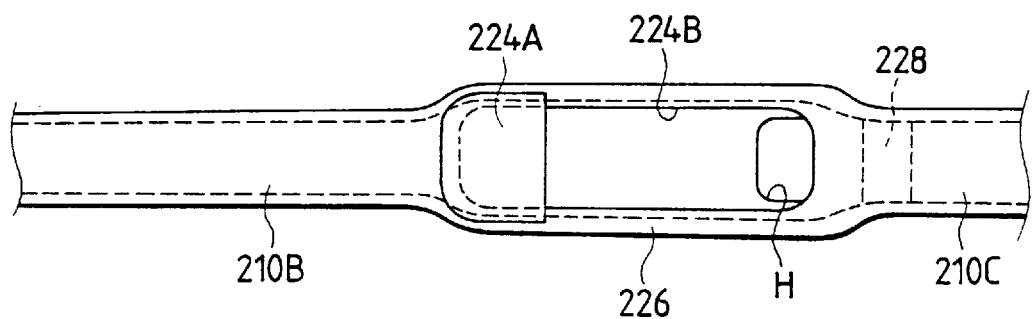
FIG. 27 is a plan view of the main portions of the fishing rod shown in FIG. 26.

As shown in FIGS. 26 and 27, in the upper surface of the large diameter part 226, there is formed a fishline introduction hole 224B which is a wide and long hole. The width of the fishline introduction hole 224B is larger than any of the outside diameters of the respective loose fishline guide members 230A, 230B and 230C and is larger than the width of the insertion portion of a fishline introduction guide member 224A. That is, the width of the hole 224B is set substantially equal to or larger than the inside diameter of the rear end portion of the middle rod part 210B, while the inside diameter of the large diameter part 226 is set equal to or larger than the inside diameter of the middle rod part rear end portion. Also, the length of the hole 224B is set longer than any of the lengths of the respective loose fishline guide members, while the length of the hole 224B is such a length that allows the insertion of the fishline introduction guide member 224A. A plug 228 is mounted on the boundary portion between the rear rod pipe part 210C and the large diameter part 226. The waterdrops that have adhered to the fishline and have invaded into the interior of the fishing rod are drained from a water drain hole H which is formed in the lower portion of the boundary portion and just before the plug 228.

The rear portion of the fishline introduction guide member includes a head portion 224b which projects upwardly. With the head portion 224b gripped, the front portion of the fishline introduction guide member is pressed into the interior portion 210I of the middle rod part 210B and, after then, while the rod pipe wall is held by and between the holding portions 224a of the fishline introduction guide member 224A, the fishline introduction guide member 224A is held in and fixed to the rod pipe. However, the head portion 224b can be omitted. Also, since the rod bottom 222 provided in the rear end portion of the fishing rod is formed of harder material than the grip 220B located forwardly of the rod bottom part 222, when the respective loose fishline guide members 230A, 230B and 230C are moved backwardly from their respective holding positions for cleaning of the middle rod pipe interior portion 210I and loose fishline guide members 230A, 230B and 230C, with the fishing rod put up in the vertical direction, the rod bottom part 222 can be dropped down onto the ground or the like and the respective loose fishline guide members can be dropped down to the position of the fishline introduction guide member 224A due to the shocks that are produced by the rod bottom part 222 when it is dropped.

Accordingly, the front end of the fishline introduction guide member 224A of the fishline introduction portion 224 acts as a stopper mechanism for stopping the backward movements of the respective loose fishline guide members. The stopper mechanism of this type is provided so as to stop the respective loose fishline guide members at positions situated 30 cm or less before and behind the fishline introduction portion. The portions of the respective loose fishline guide members situated before and behind the guide rings G are increased in diameter toward the respective end portions thereof, which facilitates the insertion of the fishline and fishline insertion tool. Also, in the front and rear positions of the fishline introduction guide member 224A, there are mounted guide rings G1 and G2 which are formed of ceramics and respectively have large and small inside diameters, in order that the fishline 218 can be guided smoothly to the interior portion of the rod pipe by the guide rings G1 and G2.

If the respective loose fishline guide members are moved backwardly, then the middle rod pipe interior portion 210I becomes hollow and smooth, so that water can be poured into the hollow middle rod pipe interior portion 210I from the fishline introduction portion 224, the top guide 212 provided at the leading end of the fishing rod, or the leading end of the fishing rod with the top guide 212 removed, thereby being able to clean the interior portion 210I. At this time, the respective loose fishline guide members can also be cleaned. Alternatively, for example, there can be formed a hole GH (FIG. 26) at a position situated forwardly of the loose fishline guide member 30A which has been moved backwardly and water can be poured from the hole GH, so that the loose fishline guide members can be cleaned.

However, in the present embodiment, as described above, the wide and long hole 224B is formed in the fishline introduction portion 224 and thus the fishline introduction guide member 224A can be taken out externally through the hole 224B. Therefore, if the respective loose fishline guide members are situated in the interior portion of the large diameter portion 226 and water is poured from the wide and long hole 224B, then the respective loose fishline guide members can be cleaned and taken out sequentially. Due to this, the loose fishline guide members can be cleaned further effectively, or as the need arises, the loose fishline guide member can be replaced with a new one or with a replacing loose fishline guide member having a different diameter, or part of the three loose fishline guide members can be removed selectively for fishing. In this manner, the maintenance of the loose fishline guide members which are worn can be carried out and the inside diameters or the like of the loose fishline guide members can be adjusted according to the thicknesses, kinds or the like of the fishlines.

After the respective loose fishline guide members are moved backwardly for maintenance such as cleaning and the like, to move forward the loose fishline guide members and hold them again at their respective given positions in the interior portion of the middle rod part 210B, if the fishing rod is held and swung, then a centrifugal force is applied to the respective loose fishline guide members to thereby cause them to move forward, and the respective loose fishline guide members are stopped and held at their respective given positions. Therefore, the respective loose fishline guide members are structured such that, when they are moved backward and are stopped by the stopper mechanism, the loose fishline guide members including the fishline introduction guide member 224A are not connected to one another.

Figure 33:
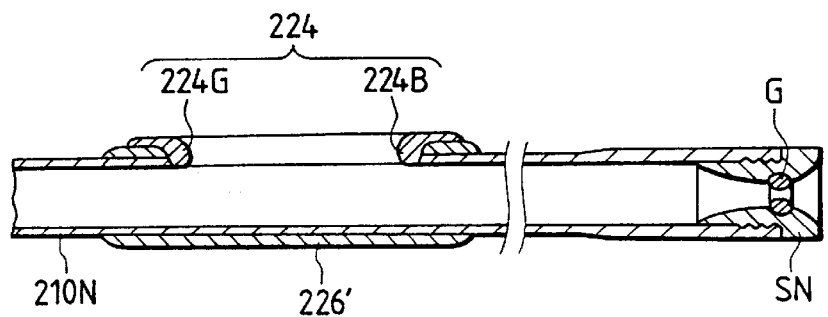
FIG. 33 is a longitudinal section view of the main portions of the fishing rod shown in FIG. 32.

As a modification of the present embodiment, if the fishline introduction portion 224 is formed as shown in FIG. 33 to be described later and also if the plug 228 is omitted or is situated at a far more backward position, then the loose fishline guide members can be moved into the interior portion of the rear rod pipe part 210C. And, if the stopper mechanism (such as a plug or the like) is set such that it can stop the backward movements of the loose fishline guide members at a position L2 situated approx. 20 cm or more forwardly of the rod bottom part, then, after maintenance, if the rear grip portion 220B is gripped and the fishing rod is swung, then a centrifugal force of a proper magnitude can be applied to the loose fishline guide members, which is very convenient for the forward movements of the loose fishline guide members. Also, in a condition that the loose fishline guide members have been moved backward, by pouring water from the fishline introduction portion or from the leading end of the fishing rod, the clearing can be easily carried out on the whole of the loose fishline guide members loosened with respect to the rod pipe interior portion 210I rod pipe inner surface.

Figure 28:
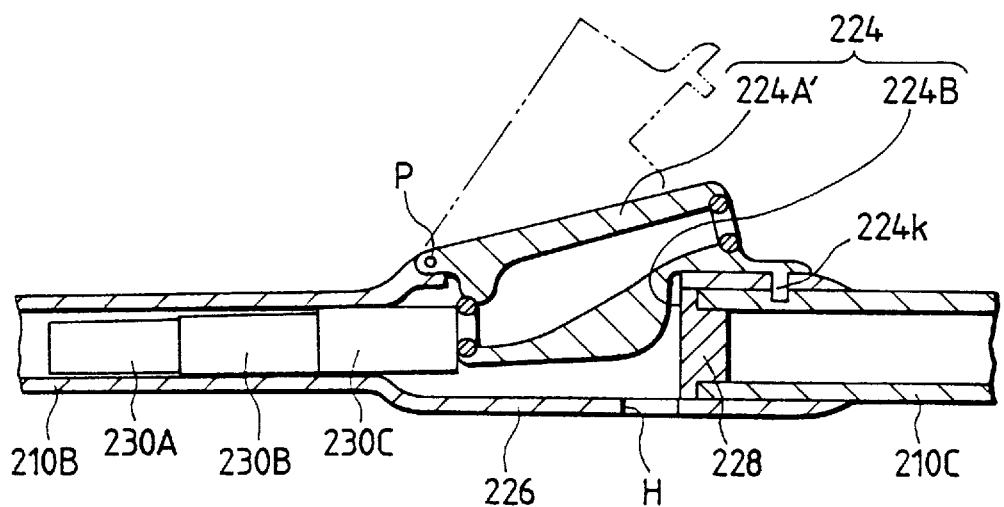
FIG. 28 is a view of a modification of the main portions of the fishing rod shown in FIG. 25.

Now, in FIG. 28, there is shown a modification of the fishline introduction portion 224 employed in the embodiment. In the modification, the rear rod pipe part 210C is fixed to the large diameter part 226 by adhesion or by pressure insertion and, normally, a fishline introduction guide member 224A' is inserted into the wide and long fishline introduction hole 224B and is secured and fixed to the rod pipe portion by a securing portion 224k. Therefore, if the loose fishline guide members are moved backward, then they are abutted against and stopped by the fishline introduction guide member 224A'. Also, when an angler wants to take out these loose fishline guide members, if the fishline introduction guide member 224A' is rotated with a shaft portion P as a pivot, then the fishline introduction guide member 224A' is moved as shown by a two-dot chained line in FIG. 28 to thereby open the fishline introduction hole 24B. In this manner, the loose fishline guide members can be taken out externally from the hole 224B.

Figure 29:
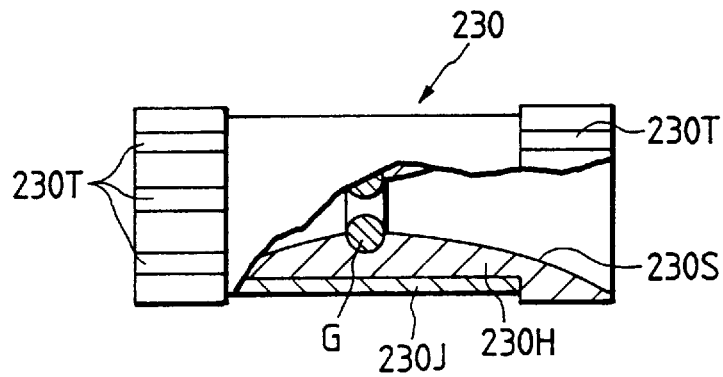
FIG. 29 is a partially longitudinal section view of the structure of a loose fishline guide member employed in the invention.
Figure 30:
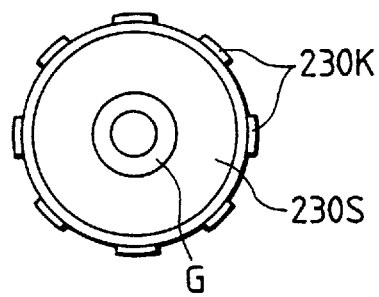
FIG. 30 is an end view of the loose fishline guide member shown in FIG. 29.

Now, FIG. 29 is a detailed view of the loose fishline guide member 230, and FIG. 30 is an end view thereof. The main body 230H of the loose fishline guide member 230, which is formed of synthetic resin, holds substantially in the central portion thereof a guide ring G which is formed of ceramics such as silicon carbide or the like, and the inner surface 230S of the guide member 230 is increased in diameter toward the two ends thereof. That is, the loose fishline guide member 230 is structured such that the fishline and fishline insertion tool can be inserted easily. The loose fishline guide member 230 includes on the outer periphery of the end portion thereof a projecting strip 230T which extends in the longitudinal direction of the loose fishline guide member 230 and, due to the existence of the projecting strip 230T, the loose fishline guide member 230 can be elastically pressed against the inner surface of the rod pipe as well as can be held positively. Also, even water is attached to the inner wall surface of the rod pipe when the loose fishline guide member is moved backward or forward, the water can be drained into a recessed portion formed between the projecting strips to thereby facilitate the movement of the loose fishline guide member. Further, 230J designates a weight member formed of material having high specific gravity and the provision of the weight member 230J increases the magnitude of the centrifugal force and the like to thereby be able to move the loose fishline guide member smoothly.

When a small loose fishline guide member is manufactured, in order to eliminate the possibility that the small loose fishline guide member cannot be moved smoothly due to shortage of the weight thereof, the main body 230H thereof may be formed of metal such as stainless steel, brass or the like, or ceramics. However, in order to dampen the shocks that are produced when the backward movement of the loose fishline guide member is caused to stop, the end portion of the loose fishline guide member may be preferably formed of synthetic resin or the like. Also, instead of the above-mentioned projecting strip, the loose fishline guide member may be coated with rubber or synthetic resin, or it may be covered with a member formed of rubber or synthetic resin. That is, in these cases as well, the loose fishline guide member can be held elastically. When the loose fishline guide member 230 is long, a plurality of guide rings may be provided in the interior portion thereof and, in order to prevent the long length thereof from worsening the flexibility of the rod pipe, the main body 230H thereof may be formed of synthetic resin or the like which is highly flexible.

Figure 31:
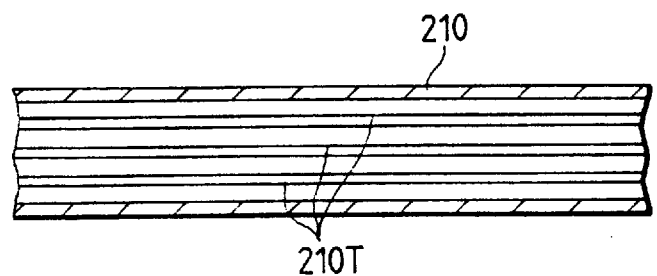
FIG. 31 is a view of a modification of the interior portion of a rod pipe employed in the invention.

When the loose fishline guide member is held in the interior portion of the rod pipe, as described above, the projecting strip or the like may be formed on the surface of the loose fishline guide member and, alternatively, as shown in FIG. 31, there can be formed in the inner surface of the rod pipe 210 a plurality of strips 210T which extend in the longitudinal direction of the rod pipe 210 or a plurality of spirally-shaped strips which extend in a direction at a gentle angle of 230 degrees or less, preferably, at an angle of 215 degrees or less with respect to the longitudinal direction of the rod pipe 210, so that the loose fishline guide member can be held due to the elasticity of the projecting strips 210T. Also, such projecting strips may be formed also in the rod top portion where no loose fishline guide member is provided so that the projecting strips can be used as guides for the fishline 218.

Now, in FIG. 32, there is shown another embodiment of a fishing rod according to the invention. In the present fishing rod, a base rod 210M includes a rear grip 220B, a trigger 225, a reel fixing device, a front grip 220A and the like, while a middle rod 210N is jointed to the base rod 210M in an ordinary manner. Further, a top rod 210H is jointed to the middle rod 210N in a swing-out and telescopic manner. A top guide 212 is removably mounted on the leading end of the top rod 210H. A plug member SN is in threaded engagement with the rear end of the middle rod 210N, the diameter of the interior portion of the middle rod 210N except for a large diameter part 226' forming a fishline introduction portion 224 situated in the middle of the middle rod is tapered, and loose fishline guide members 230B and 230C are held at their respective given positions in front of the fishline introduction portion 224.

Similarly to the above-mentioned case, if the fishing rod is put up vertically and is then dropped down so that a rod bottom 222 provided at the rear end of the fishing rod is abutted against the ground or the like, then the loose fishline guide members are removed from their holding conditions and are dropped or moved backwardly. However, in the present embodiment, if the top rod 210H is stored, then the loose fishline guide members can be removed from their holding conditions and thus can be moved backwardly. Referring here to FIG. 33, in the large diameter part 226', there is mounted a fishline introduction guide member 224G which is formed of ceramics and includes an elongated hole 224B, and the lower end side (i.e. the radially inner side with respect to the middle rod 210N) of the fishline introduction guide member 224G is formed substantially flush with the inner surface of the middle rod 210N, so that the loose fishline guide members and top rod 210H can be moved therethrough from the front side thereof. Therefore, if the plug member SN at the rear end of the middle rod is removed, then the loose fishline guide members and top rod 210H can be taken out therefrom, thereby being able to carry out maintenance very easily. Also, when the number of the middle rod 210N is one, no guide ring G is necessary in the interior of the plug member SN shown in FIG. 33. However, if the middle rod is divided into two or more parts and if they are situated at least in front of the fishline introduction portion 224, then the guide rings G must be provided.

When the loose fishline guide members are moved backward up to the position of the plug member SN at the rear end of the middle rod 210N and then water is poured from a hole H' formed in the front portion of the middle rod to thereby clean the inner portion of the middle rod, or when, after the plug member is removed and the loose fishline guide members are taken out, the loose fishline guide members are inserted and moved forward through the middle rod, it is simple and easy to move them forward by means of a centrifugal force. For this purpose, if the distance L3 between the plug member SN and the rear end of the fishing rod is 20 cm or more (preferably, the distance between the trigger 225 and the plug member SN is 20 cm or more), then a centrifugal force can be applied to the loose fishline guide members easily by swinging the fishing rod.

The ordinary joint between the middle rod 210N and base rod 210M may be an inverted ordinary joint with the base rod side formed as a male type, or the middle rod 210N and base rod 210M may be removably fixed to each other by means of a band, a screw or the like. If the middle rod 210N can be taken out from the front side of the base rod 210M, the plug member SN at the rear end of the middle rod (when two or more middle rods are provided, the rear end of the middle rod in which the loose fishline guide members are disposed) can be removed even if the middle rod cannot be taken out from the rear side of the fishing rod through the interior portion of the base rod, so that the loose fishline guide members disposed in the interior portion of the middle rod can be taken out.

Figure 34:
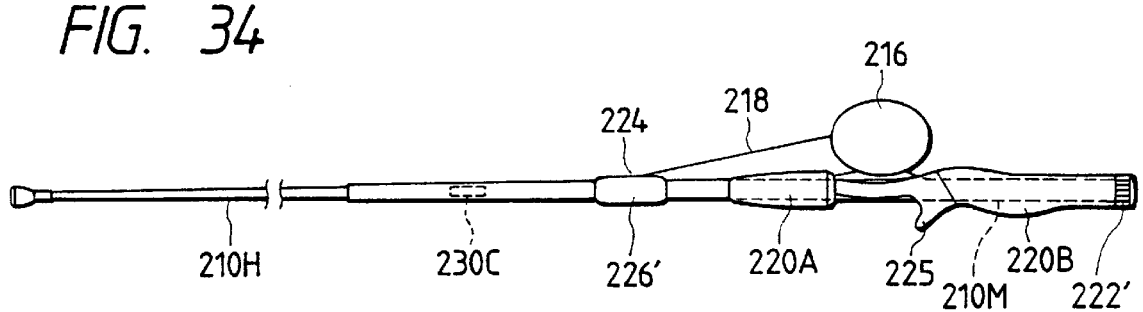
FIG. 34 is a side view of still another embodiment of an intra-line fishing rod according to the invention.

Now, in FIG. 34, there is shown another embodiment of a casting rod according to the invention. In the present embodiment, a top rod 210H is jointed to a base rod 10M in a swing-out and telescopic manner, the base rod 210M includes a rear grip 220B and a front grip 220A, and, between the front and rear grips 220A and 220B, there is disposed a reel fixing device on which a reel 216 can be mounted. A trigger is formed on the front side of the rear grip 220B and on the opposite side of the reel 216. Also, in front of the reel 216, there is provided a large diameter part 226' which forms a fishline introduction portion 224 having such a shape as shown in FIG. 33. A loose fishline guide member 230C is disposed and held at a position situated in front of the fishline introduction portion 224 and within the interior portion of the base rod.

A rod bottom part 222' is in threaded engagement with the rear end of the base rod 210M, and the interior portion of the base rod, that is, the rear portion thereof situated backwardly of the position of the loose fishline guide member 230C is formed so as to have such an inside diameter that allows insertion of the loose fishline guide member. In the present casting rod, if the top rod 210H is stored, then the holding of the loose fishline guide member 230C can be removed and thus the top rod 210H as well as the loose fishline guide member 230C also can be removed and taken out from the rear end of the base rod by removing the rod bottom part 22'. Therefore, maintenance such as cleaning and the like is easy. Also, since the top rod 210H can be stored deep into the rear portion of the interior of the base rod, the storage dimension of the casting rod can be shortened and thus the casting rod is convenient for carriage. In this case, while the fishline 218 remains inserted through the loose fishline guide member 230C and top rod 210H, the top rod 210H can be stored into the base rod (the interior portion of the base rod is formed so as to have such an inside diameter that allows this storage). Also, since the top rod can be formed longer by a length that is enlarged with this storage manner, the joint portion of the top rod with respect to the base rod 210M can be formed incise rearwardly with respect to the whole fishing rod, and the joint portion hard to flex can be formed apart from the greatly flexing area, thereby being able to provide a casting rod of high quality. However, the structure that allows the loose fishline guide member and the top rod to be taken out from the rear end of the fishing rod can also be applied to every kind of fishing rod such as a spinning rod, a boat rod and the like in which the trigger 225 is not provided.

Figure 35:
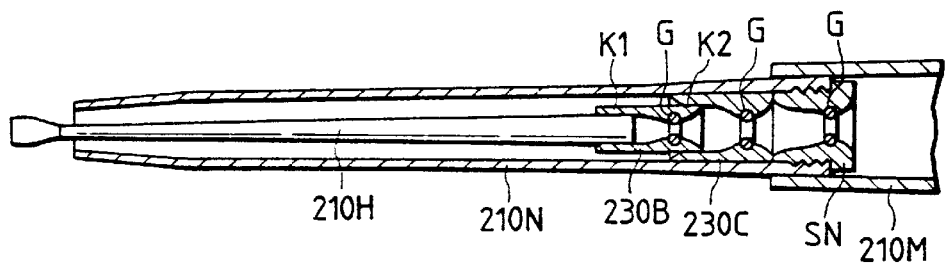
FIG. 35 is a longitudinal section view of another embodiment of the structure of the loose fishline guide member employed in the invention.

Referring now to FIG. 35, a middle rod 210N is jointed to a base rod 210M in an ordinary manner and a top rod 210H is jointed to the middle rod 210N in a swing-out manner (in FIG. 35, for easy explanation of the relation of the top rod with respect to the loose fishline guide member, the rear end portion of the top rod is shown too narrow to be jointed in a swing-out manner). As in FIGS. 32 and 34, when one or a plurality of loose fishline guide members 230B, 230C are disposed in the middle rod 210N forming a large diameter rod pipe and also when the top rod 210H forming a small diameter rod pipe of a swing-out joint type is stored therein to thereby move the loose fishline guide members to the plug member SN at the rear end of the middle rod, in order that the top rod 210H can be pulled out again and the loose fishline guide members can be held again at their respective holding positions after maintenance, the rear portion K2 of the forwardly situated loose fishline guide member and the rear end portion K1 of the top rod may be retained to the front portions of the respective loose fishline guide members so that they can be stored in a connected manner, and the respective retaining or holding forces may be set such that they become smaller toward the backward direction (when only one loose fishline guide member is used, it may be only connected to the rear end of the top rod). In this structure, the loose fishline guide members can be pulled out simultaneously when the top rod is pulled, and then the loose fishline guide members can be disconnected from the connected loose fishline guide members and can be held in the interior portion of the middle rod 210N sequentially from the rearmost loose fishline guide member. Also, if the guide ring G is mounted at a position situated backwardly of the main body of each of the loose fishline guide members and the front portion thereof is opened so that the forwardly positioned loose fishline guide member and top rod can be fitted deeply into the mating front portions of the backwardly positioned loose fishline guide members then the storage dimension of the fishing rod can be shortened.

As can be seen clearly from the foregoing description, according to the invention, not only the insertion resistance of the fishline can be reduced but also the interior portion of the rod pipe and loose fishline guide members can be cared for easily.

Also, the loose fishline guide members can be inserted and removed easily to thereby be able to facilitate the maintenance of the loose fishline guide members and the rod pipe interior portion such as replacement or the like.

FIG. 36 shows an intra-line fishing rod a casting rod according to the present invention, in which a rod pipe is formed of fiber reinforced prepreg or the like, the prepreg being made of carbon fibers which are impregnated with epoxy resin. In the present fishing rod, a large diameter part 312 is disposed in front of a rear rod pipe part 310A, a middle rod pipe part 310B is disposed in front of the large diameter part 312, and a top rod part 310C forms the front portion of the middle rod pipe part 310B, that is, the middle rod pipe part 310B and top rod part 310C are formed integral with each other to present a tapered shape. As can be seen from FIG. 37 as well, the middle rod pipe part 310B, large diameter part 312, and rear rod pipe part 310A are also formed integral with one another. Also, the leading end portion of the top rod part 310C is formed as a water drain portion 314 and a top guide 316 is provided at the leading end of the water drain portion 314.

Figure 37:
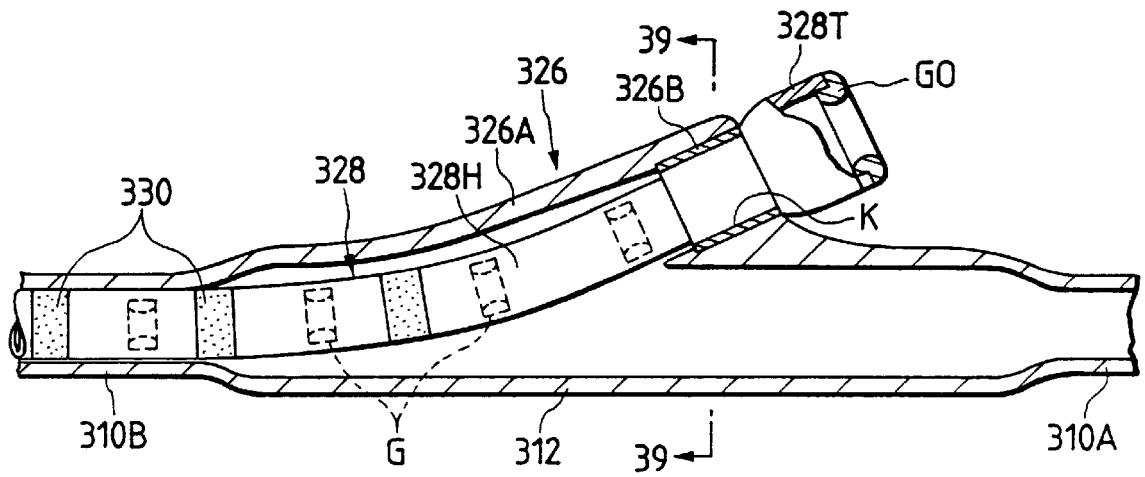
FIG. 37 is an enlarged longitudinal section view of the main portions of the embodiment shown in FIG. 36.
Figure 38:
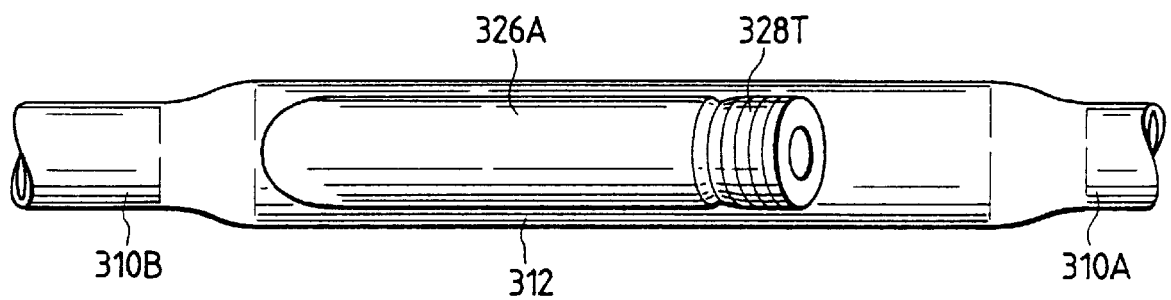
FIG. 38 is a plan view of the main portions of the embodiment shown in FIG. 36.
Figure 39:
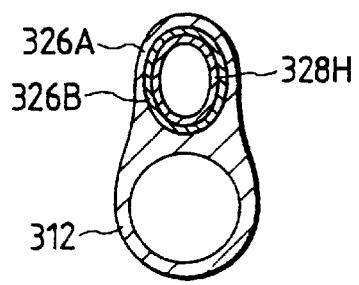
FIG. 39 is a section view taken along the arrow line 39—39 of FIG. 37.

In the rear portion of the rear rod pipe part 310A, a double bearing type reel 322 is interposed between a rear grip 318A and a front grip 318B, and a trigger 320 is formed in a position which is situated downwardly and backwardly of the reel 322. A rod bottom part 319 is formed of material harder than the material of the front and rear grips. The large diameter part 312 forms a fishline introduction portion 326 which is used to introduce a fishline 324 from the reel 322 into the interior of the rod pipe, while the inside diameter of the large diameter part 312 is larger than the inside diameter of the rod pipe parts 310A and 310B respectively situated before and behind it. Since the bending rigidity of the large diameter part is increased due to the large outside diameter thereof, the large diameter part 312 may be preferably formed of low elastic module material to thereby be able to prevent the fishing rod from increasing in bending rigidity in the local portions thereof. The fishline introduction portion 326 includes a nose-like main body 326A with an opening K formed therein and a fishline guide member 328 as shown in FIGS. 37–39 is inserted through the opening K into the interior portion of the rod pipe and is held therein.

In particular, in the inner periphery of the opening K of the nose-like main body 326A, there is provided an annular member 326B formed of rubber or synthetic resin in such a manner that the annular member 326B can pressure contact and hold the fishline guide member 328 elastically. Also, the fishline guide member 328 must be curved to such a degree as shown in FIG. 37 and, for this purpose, a main body 328H of the fishline guide member 328 is formed of synthetic resin or the like. Therefore, even when the annular member 326B is formed of metal, the fishline guide member 328 can be inserted into and held in the interior portion of the rod pipe through the opening K.

Also, the fishline guide member main body 328H may be formed of fiber reinforced prepreg, a rubber pipe or the like besides the above-mentioned synthetic resin. Further, to produce the fishline guide member main body 328H, a large number of parts formed of hard material such as metal or the like may be connected together in such a manner that the resultant structure is bendable. The head portion 328T of the fishline guide member main body 328H has an outside diameter larger than the size of the opening K and thus, when the fishline guide member is inserted, if the head portion 328T is situated outside the opening K, then the whole of the fishline guide member 328 can be positioned. A fishline guide ring GO formed of ceramics is fixed to the end portion of the head portion 328T and the fishline 324 can be inserted into the interior portion of the rod pipe through the fishline guide ring GO.

Figure 43:
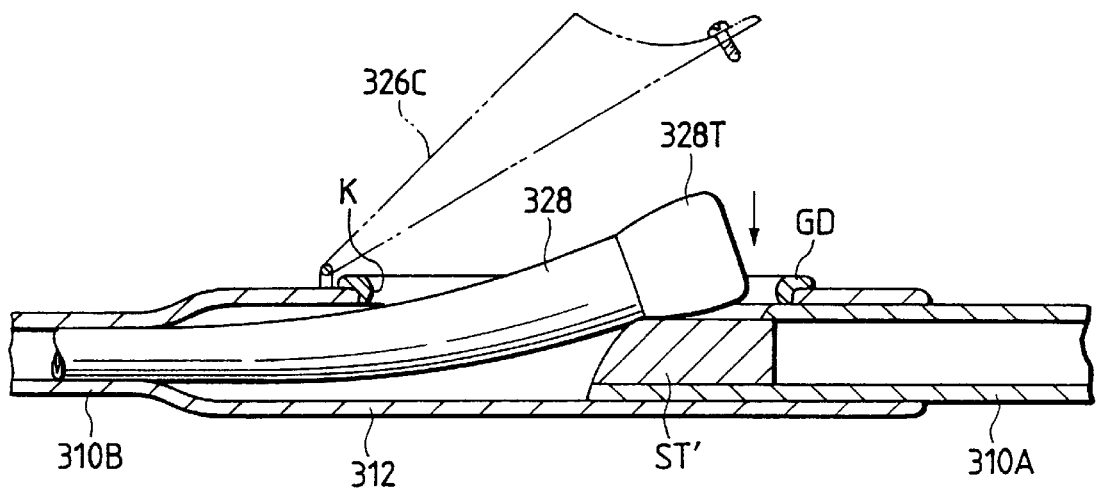
FIG. 43 is a longitudinal section view of another embodiment of the main portions of an intra-line fishing rod according to the invention.

In the interior portion of the fishline guide member main body 328H, there are provided a plurality of inwardly projecting fishline guide rings G in such a manner that they are spaced from one another at proper intervals. Also, on the outer side of the main body 328H, there is coated synthetic resin or rubber in some positions in the longitudinal direction of the main body 328H, or there are provided a plurality of pressure contact/hold members 330 which can be obtained in such a manner that annular parts are firstly produced and are then adhered and fixed to the out side of the main body 328H. The pressure contact/hold members 330 need not be formed over the whole periphery of the circumferential direction of the main body 328H, that is, they may be formed on part of the circumference thereof. Further, the portion of the fishline guide member main body 328H, that is situated within the large diameter part 312, is set so as to have an outside diameter substantially equal to the outside diameter of the portion of the fishline guide member main body 328H that is situated in the rear end position of the tapered middle rod pipe part 310B in view of the bendability. However, this is not limitative but, for example, as shown in FIG. 43, the whole of the fishline guide member 328 may be formed tapered, so that, when the fishline guide member 328 is inserted into the interior portion of the middle rod pipe part 310B, the fishline guide member 328 can be set in a pressure insertion condition due to the gradual increase in the outside diameter thereof and thus the insertion position of the fishline guide member 328 can be determined properly.

Figure 44:
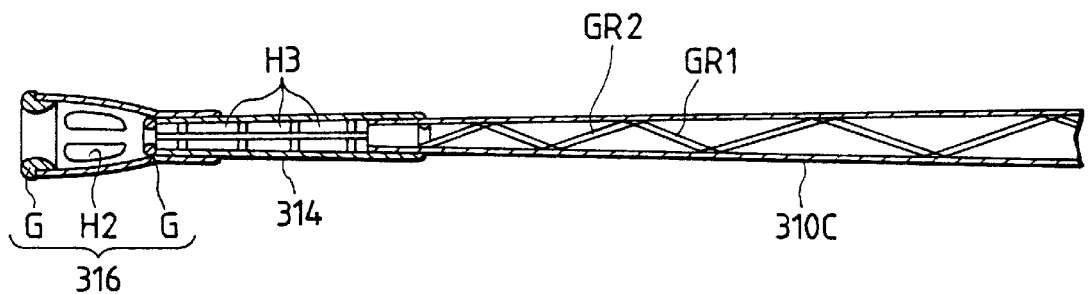
FIG. 44 is an enlarged longitudinal section view of a top rod part shown in FIG. 36.

The present fishline guide member 328 is inserted and disposed over the whole length of the middle rod pipe part 310B, whereas the top rod part 310C situated in front of the middle rod pipe part 310B and having a smaller diameter employs a structure which is shown in FIG. 44 (to be described later) and is different from the structure of the fishline guide member 328. When taking out the present fishline guide member 328, with the head portion 328T thereof pinched with fingers, the fishline guide member 328 can be taken out externally. Also, when inserting it, finally, the head portion 328T may be pinched with fingers before the fishline guide member 328 can be pushed in. In view of such operation, on the surface of the head portion 328T, there is formed a slippage preventive uneven strip which extends in the circumferential direction thereof.

Now, FIG. 44 shows the front portion of the fishing rod starting at the top rod part 310C. In the inner wall surface of the top rod part 310C, there are provided two strips of spiral fishline guides GR1 and GR2 which are formed integral with the rod pipe, project inwardly, and circle in the mutually opposite directions. However, the integral formation of the fishline guides with the rod pipe is not limitative but, for example, two spiral fishline guides may be formed separately and then they may be adhesively fixed to the inner surface of the rod pipe, or they may be pressure inserted. Or, they may be omitted.

The water drain portion 314 is formed of wire-line members and includes a large number of water drain holes H3 formed thereby. Also, the top guide 316 includes two fishline guide rings G formed of ceramics which are respectively disposed in the front and rear portions thereof, and further includes water drain holes H2 which are formed in the intermediate portion there between.

Figure 40:
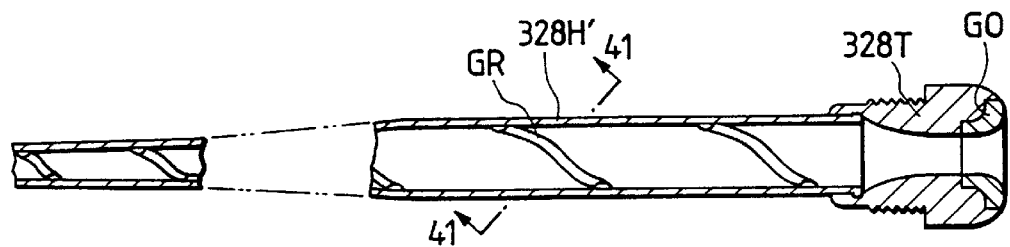
FIG. 40 is a longitudinal section view of another embodiment of a fishing guide member employed in the invention.
Figure 41:
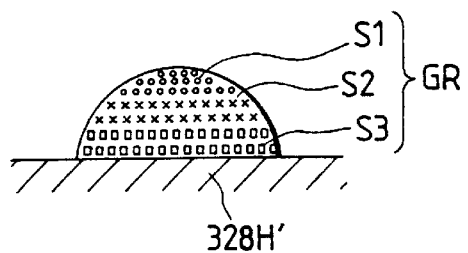
FIG. 41 is an enlarged cross section view taken along the arrow line 41—41 of FIG. 40.

Now, FIG. 40 is a longitudinal section view of a fishline guide member which can be used in place of the fishline guide member 328, in which the head portion 328T thereof includes an external thread on the outer periphery thereof and thus the head portion 328T and main body portion 328H' of the fishline guide member are rotatable with respect to each other. Also, a fishline guide ring GO formed of ceramics is fixed to the end portion of the head portion 328T. On the other hand, in the inner periphery of the opening K of the nose-like main body 326A of the fishline introduction portion 326, there is formed an internal thread in place of the annular member 326B. Therefore, in the embodiment shown in FIG. 40, the fishline guide member is pushed into the rod pipe interior portion through the opening K and, finally, the head portion 328T is threadedly engaged with the internal thread portion of the opening for holding the fishline guide member. In the inner wall surface of the fishline guide member main body 328H', there is provided a strip of spiral fishline guide GR which is formed integral with the above inner wall surface and projects inwardly therefrom. Two or more strips of fishline guides may also be employed or the fishline guide(s) may be pressed into the fishline guide member main body portion. In FIG. 41, there is shown an enlarged cross section view of the spiral fishline guide GR, taken along the line 41—41 in FIG. 40. The spiral fishline guide shown in FIG. 44 can be structured similarly to the present embodiment.

In the present embodiment, carbon fibers S3 are disposed in the inner layer portion nearest the fishline guide member main body portion 328H', metal fibers S2 are disposed in the middle layer portion, and ceramics fibers S1 are disposed in the outer layer portion, while gaps between these fibers are filled up with synthetic resin. When the fishline guide member main body portion 328H' is formed of synthetic resin, if the spiral fishline guide GR is formed of the same kind of synthetic resin, then they can be united together with ease. The existence of the carbon fibers S3 contributes to the increase in elasticity and strength and the reduction in weight for the spiral fishline guide GR, the existence of the metal fibers S2 contributes to the increased stickiness and strength of the spiral fishline guide GB, and the existence of the ceramics fibers S1 on the surface thereof contributes to the enhanced wear resistance of the spiral fishline guide GB.

Alternatively, the fishline guide member main body portion 328H' may be omitted and the fishline guide member may be composed of the spiral fishline guide GR only.

Figure 42:
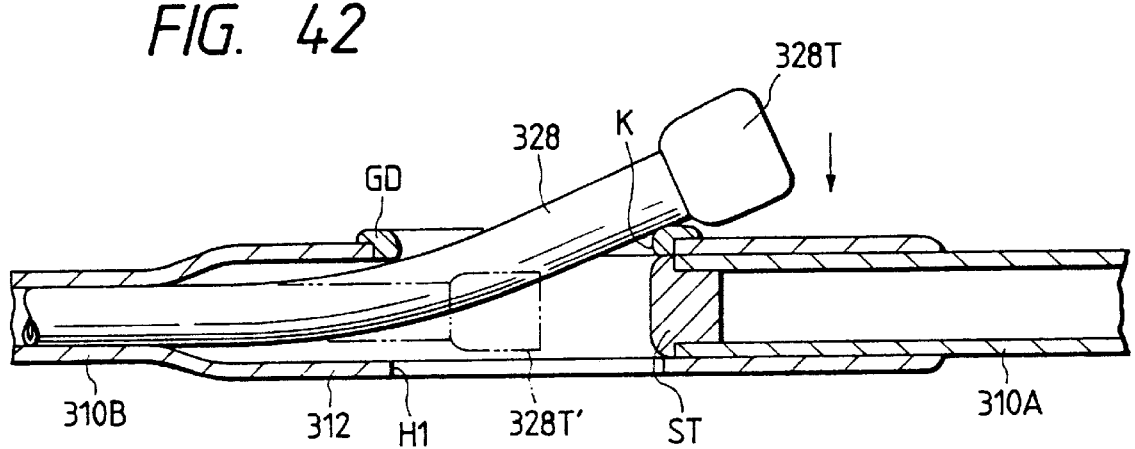
FIG. 42 is a longitudinal section view of another embodiment of the main portions of an intra-line fishing rod according to the invention.

Now, in FIG. 42, there is shown another embodiment of the main portions of a fishing rod according to the invention. In the present embodiment, a large diameter part 312 and a middle rod pipe part 310B (and a top rod part 310C) are formed of prepreg in a united body, whereas a rear rod pipe part 310A is adhesively fixed to the large diameter part 312. However, alternatively, the middle rod pipe part may also be fixed adhesively. A plug member ST for water prevention is adhesively fixed to the front end portion of the rear rod pipe part 310A and, in the lower side wall portion of the large diameter part 312 situated just before the plug member ST, there is formed a hole H1 for water drain. And, in the upper side wall portion of the large diameter part 312, there is provided as a fishline introduction guide a fishline guide ring GD which is formed of ceramics, has a width equal to or greater than the outside diameter of the fishline guide member 328, and includes an opening K long in the longitudinal direction thereof.

The fishline guide member 328 is inserted into the interior portion of the rod pipe from the opening K of the fishline guide ring GD. In this case, since the fishline guide member 328 is curved in such a manner as shown in FIG. 42, the fishline guide member 328 receives a force in the direction of an arrow shown in FIG. 42 due to its restitutive force. This causes the big head portion 328T of the fishline guide member 328 to be secured to the fishline guide ring GD, whereby the fishline guide member 328 can be held at its given position.

Therefore, by inserting the fishline into the interior portion of the fishline guide member 328 in this manner, fishing can be executed. Alternatively, in the present embodiment, the fishline guide member 328 may be taken out and removed and the fishline line may be inserted through the fishline guide ring GD, before fishing can be executed.

Also, even when the fishline guide member 328 is inserted into the interior portion of the middle rod pipe part 310B and is thus put into a pressure insertion condition so that the head portion thereof is located at a given position situated adjacent to the opening K and shown by a two-dot chained line 328T', if the head portion is taken out from the opening K by use of a proper securing tool, then the whole fishline guide member 328 can be pulled out externally from the middle rod pipe part 310B. Further, if the water drain hole H1 is formed in such a size as allows the finger to be inserted therethrough, then by pushing up the fishline guide member 328 from the lower side of the large diameter part 312 with the finger, the fishline guide member 328 can be taken out externally from the opening K of the fishline guide ring GD.

Now, in FIG. 43, there is shown another embodiment of the main portions of a fishing rod according to the invention. In the present embodiment, a large diameter part 312 and a middle rod pipe part 310B (and a top rod part 310C) are formed of prepreg as a united body, whereas a rear rod pipe part 310A is adhesively fixed to the large diameter part 312. In the top portion of the large diameter part 312, there is provided as a fishline introduction guide a fishline guide ring GD which is formed of ceramics, has a given width, and includes an opening K long in the longitudinal direction thereof. A receive member ST' is fixed to the front end of the rear rod pipe part 310A, while the upper surface of the receive member ST' is set at a position which is situated lower than the outer peripheries of the fishing guide ring GD and large diameter part 312, that is, the upper surface of the receive member ST' internally is shifted toward the central portion relative to the outer peripheries of the guide ring GD and large diameter part 312. Due to this, the head portion 328T of the fishline guide member 328 put on the upper surface of the receive member ST' can be set at a low position to thereby be able to reduce the amount of bending of the fishline guide member 328 accordingly, which makes it possible to facilitate the manufacture as well as the insertion and removal of the fishline guide member 328. In this manner, preferably, the amount of bending of the fishline guide member 328 may be set an angle of 345 degrees or less with respect to the longitudinal axis of the rod pipe. More preferably, it may be set in the range of 5–20 degrees.

In the present embodiment as well, the restitutive force of the fishline guide member 328 can secure the big head portion 328T of the fishline guide member 328 to the receive member ST', so that the fishline guide member 328 can be held in its given state. However, alternatively, the fishline guide member 328 can be structured in another manner. For example, such pressure contact/hold member 330 as shown in FIG. 37 may be provided in the fishline guide member 328 so that the fishline guide member 328 can be pressure inserted into the middle rod pipe part 310B.

Further, a removable cover member 326C for covering the rear portion of the fishline guide member 328 may be mounted on the fishline guide member 328.

Figure 45:
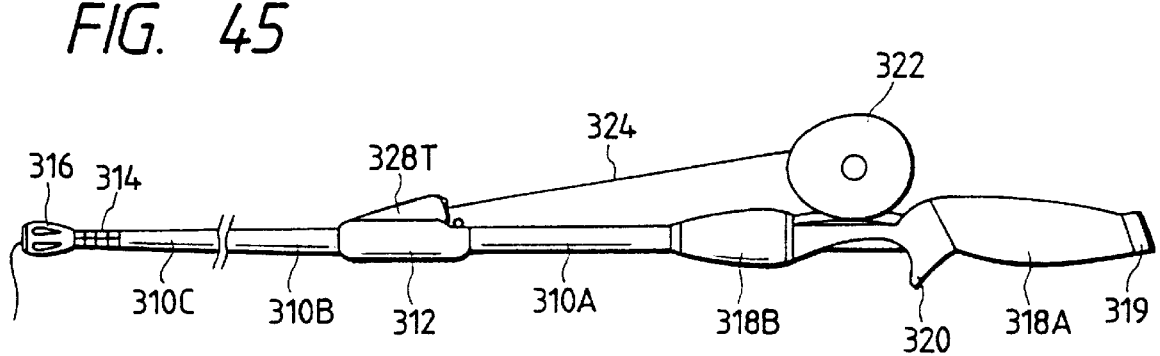
FIG. 45 is a side view of another embodiment of an intra-line fishing rod according to the invention.

Now, in FIG. 45, there is shown still another embodiment of the main portions of a fishing rod according to the invention. In the present embodiment, the whole structure of the fishing rod is similar to the fishing rod shown in FIG. 36, whereas a large diameter part 312 is different in structure from the embodiment shown in FIG. 36 and the structure of the large diameter part 312 according to the present embodiment is shown enlargedly in FIG. 46. On the other hand, a pipe guide 328P is held and fixed by a nose-like hold member (head portion) 328T, while a spiral fishline guide GR is connected through a connecting portion 328R to the leading end of the pipe guide 328P. Also, a fishline guide ring GO formed of ceramics is mounted on the rear end portion of the pipe guide 328P. The present fishline guide member is made up of the spiral fishline guide GR and the head portion 328T including the pipe guide and fishline guide ring. A securing portion 326K is formed in the front end portion of the head portion 328T and, after the fishline guide member is inserted into the opening K, if the head portion 328T is moved forward, then the securing portion 326K is secured to the upper wall edge of the large diameter part 312.

Also, a screw member 332 is provided in the rear portion of the fishline guide member and thus, at a position where the head portion thereof is advanced, the fishline guide member can be fixed to the large diameter part 312. In place of the screw member, a pressure insertion member may be used. Or, for example, there may be formed in the large diameter part a long hole long in the longitudinal direction thereof, the front portion of the long hole may be formed as a small hole while the rear portion thereof may be formed as a large hole, a projection may be formed in the lower surface of the rear portion of the head portion 328T in such a manner that the front portion of the projection is formed as a large diameter portion, the projection may be inserted into the rear portion of the long hole, and, after then, the projection may be moved forward to the front portion or small hole of the long hole so that it can be secured in the small hole. A hole H4 is a peephole or window hole through which it is possible to check whether the neighboring portion of the connecting portion is dirty or not. Instead of the peephole H4, a transparent window may be employed.

Figure 46:
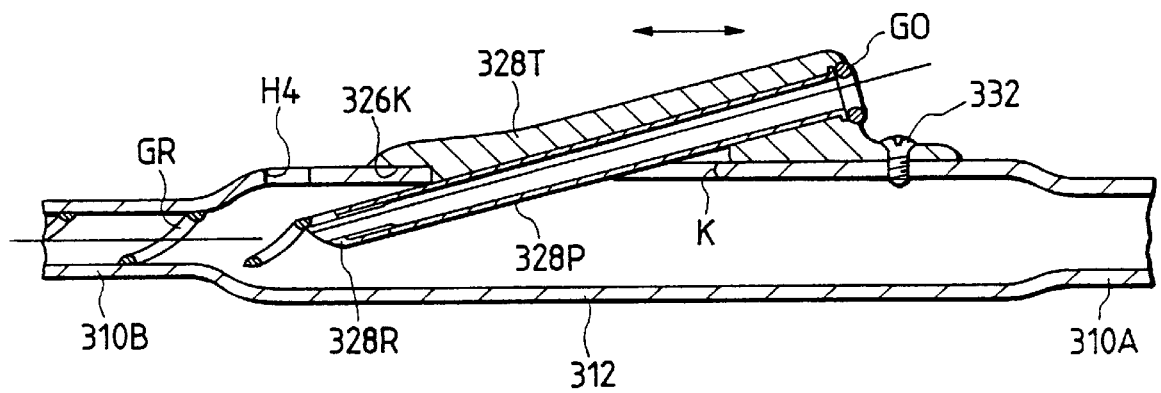
FIG. 46 is an enlarged longitudinal section view of the main portions of the embodiment shown in FIG. 45.
Figure 47:
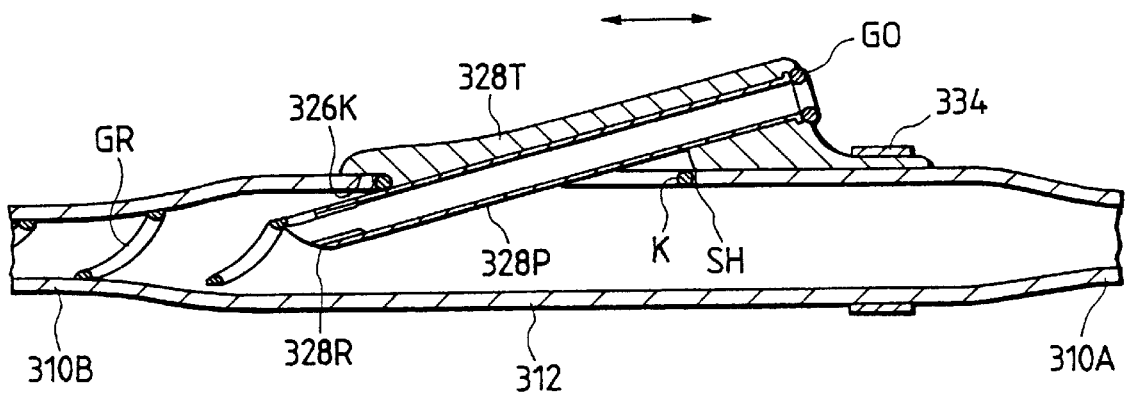
FIG. 47 is a modification of the embodiment shown in FIG. 16.

FIG. 47 shows a modification of the embodiment shown in FIG. 46. The present modification is different from the embodiment shown in FIG. 46 in that the peripheral wall edge of the opening K is coated with ceramics, there is provided a reinforced portion SH with a metal member mounted thereon, the head portion 328T of the fishline guide member is held and fixed by a fixing ring 334 movable back and forth instead of the screw member 332. The remaining portions of the present modification are similar to the embodiment shown in FIG. 46.

In the above description, as the opening, there has been used the opening formed in the fishline introduction portion. However, this is not limitative, but there can be used any one of other openings which are formed at other positions in the side surface of the fishing rod. That is, the present invention can be applied to an intra-line fishing rod as long as the rod has an opening through which a continuous fishline guide member is insertable into the rod.

As can be seen clearly from the foregoing description, according to the invention, there is provided an inwardly projecting fishline guide in a fishline guide member and thus a fishline, which is inserted into the fishline guide member, can be guided in such a manner that the fishline is only in partial contact with the fishline guide in the longitudinal direction thereof. Also, since the fishline guide member is held in such a manner that it is substantially in contact with the inner wall surface of the rod pipe, there can be provided a large interior space, which can reduce the fishline resistance as much as possible.

Since the head portion of the fishline guide member is situated adjacent to an opening formed in the side surface of the fishing rod and the fishline guide member has such a degree of flexibility as allows the fishline guide member to be taken out externally from the opening, when the head portion is situated outside the opening, if the head portion is pinched with fingers, then the fishline guide member can be take out externally from the opening and, on the other hand, when the head portion is situated within the interior portion of the rod pipe, the fishline guide member can be pulled out externally by catching the head portion by use of proper engaging means, or when the opening has such a size as allows the little finger to be inserted therethrough, the fishline guide member can be pulled out externally by catching the head portion thereof with the little finger. Since the fishline guide member can be taken out in this manner, the maintenance such as cleaning or the like of the rod pipe interior portion as well as the maintenance of the fishline guide member can be carried out easily. Further, if a plurality of fishline guides are used, since they are connected to one another, the fishline guides can be inserted or removed simultaneously which can enhance the facility of the maintenance of the fishing rod.

Also, since the fishline guide member is held in such a manner that it is substantially in contact with the inner wall surface of the rod pipe, it is stabilized in attitude and is almost prevented from getting rickety or swinging during the fishing operation, and such prevention of the swinging motion of the fishline guide makes assures the smooth insertion of the fishline.

Figure 48:
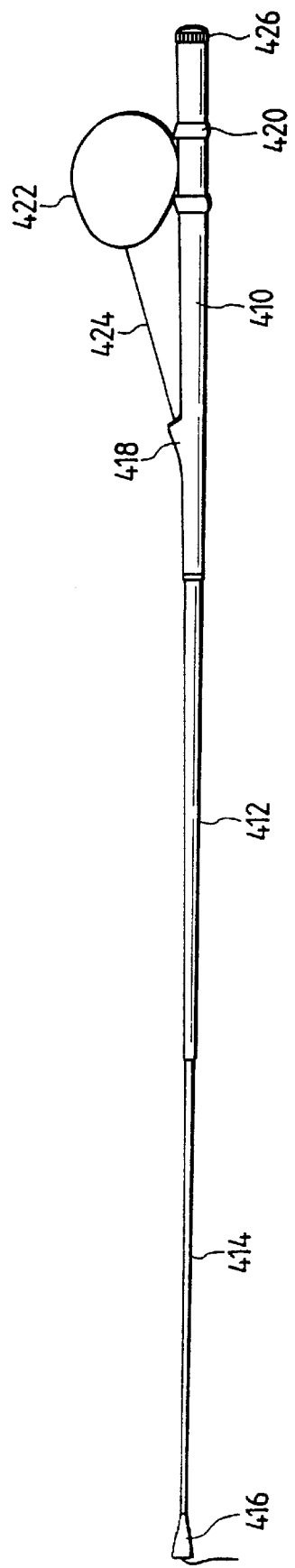
FIG. 48 is a side view of another embodiment of a joint type intra-line fishing rod according to the invention.

FIG. 48 is a side view of a swing-out joint type intra-line fishing rod according to another embodiment of the invention. In the fishing rod, a middle rod 412 is jointed to a base rod 410 in a swing-out manner, a top rod 414 is jointed to the middle rod 412 in a swing-out manner. A reel fixing device 420 is mounted on the base rod 410 and a double bearing reel 422 is fixed to the reel fixing device 420. A fishline 424 is introduced through a fishline introduction guide 418 provided in the front portion of the base rod 410, is then passed through the middle and top rods and is finally drawn out externally from a top guide 416 provided at the leading end of the top rod. Reference character 426 designates a rod bottom part.

Figure 49:
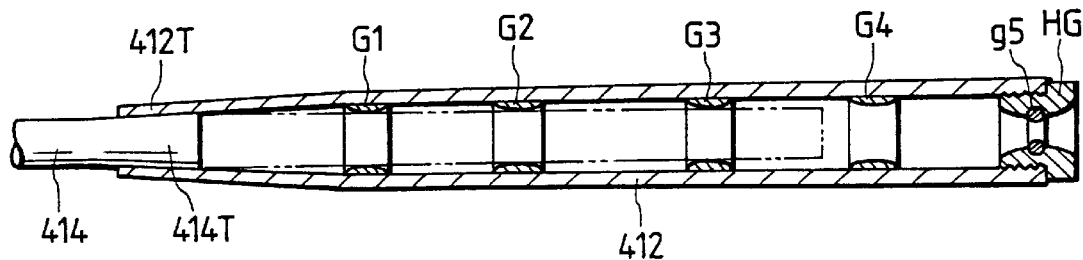
FIG. 49 is a longitudinal section view of the main portions of the fishing rod shown in FIG. 48.

Now, FIG. 49 is a partially longitudinal section view of the top rod (a small diameter rod pipe) 414 and the middle rod (a large diameter rod pipe) 412 respectively shown in FIG. 48. The rear end portion 414T or the joint portion of the top rod 414 is jointed to the interior of the leading end portion or the joint portion 412T of the middle rod 412 in a swing-out joint manner. In the interior portion of the middle rod 412 situated backwardly of the joint portion thereof, fishline guides G1, G2, G3 and G4 respectively formed of ceramics are projectingly disposed in this order. Also, a holding member HG holding a fishline guide main body g5 is in threaded engagement with the rear end of the middle rod 412. The inside diameters of the fishline guides G1, G2, G3 and G4 are set larger than the outside diameter of the rear end portion 414T that is the greatest outside diameter of the top rod 414. Therefore, during the fishing operation, the fishline can be guided by the fishline guides without being contacted with the inner surface of the middle rod 412 wet with water, so that the fishline insertion resistance can be reduced as well as, when the top rod 414 is stored, the top rod 414 can be stored deeply into the rear portion of the middle rod 412 as shown by a two-dot chained line in FIG. 49.

If the fishing rod is structured in an ordinary removable joint type, the holding member HG from the middle rod 412 can permit the top rod 414 to be stored from the rear end of the middle rod 412.

Figure 50:
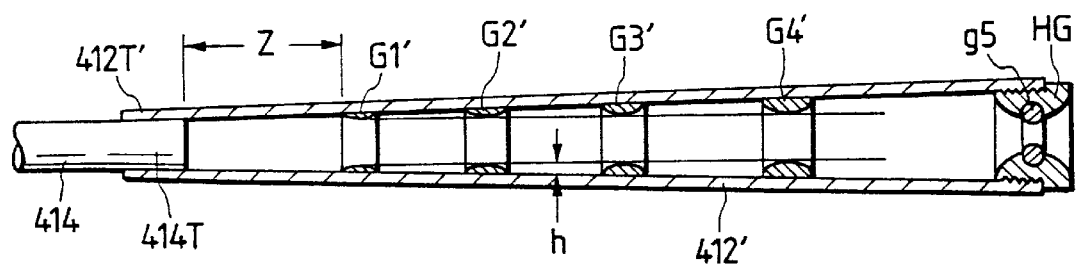
FIG. 50 is a longitudinal section view of the main portions of another embodiment of an intra-line fishing rod according to the invention.

Now, FIG. 50 shows another embodiment of a joint type intra-line fishing rod according to the invention. In this embodiment, a middle rod 412' is tapered in both the inside and outside thereof over the entire length thereof. In a given range Z extending backwardly of the leading end portion 412T' of the middle rod 412 to which the rear end portion 414T of a top rod 414 is jointed, no fishline guide is provided in the interior portion thereof, whereas, in the portion of the middle rod 412 extending backwardly of the given range Z, fishline guides G1', G2', G3' and G4' are sequentially provided in such a manner that they project inwardly. Also, similarly to the embodiment shown in FIG. 49, a fishline guide main body g5 which is held by a holding member HG is mounted on the rear end of the middle rod 412'. In this case, the inside diameters of the respective fishline guides are formed larger than the rear end portion of the top rod and are also formed so as to increase backwardly with in a ratio which substantially equal or smaller than the tapered ratio of the inside diameter of the middle rod 412'. Therefore, in a swing-out joint type fishing rod, the top rod 414 can be stored deep into the rear portion of the middle rod 412'. Further, the more backwardly the fishline guides are situated, the greater heights (thicknesses) h they have.

Even in an ordinary joint type, similarly to the above case, the top rod 414 can be stored into the middle rod 412' from the rear end thereof.

Therefore, the respective fishline guides are structured such that the heights h thereof are as great as possible, which can minimize the danger that the fishline can be contacted with the inner surface of the middle rod, thereby being able to reduce the fishline insertion resistance accordingly.

In the embodiment shown in FIG. 50, the whole of the large diameter rod pipe 412' is formed in a tapered shape which increases in diameter backwardly. However, alternatively, the large diameter rod pipe may be partially formed in a tapered shape.

Figure 51:
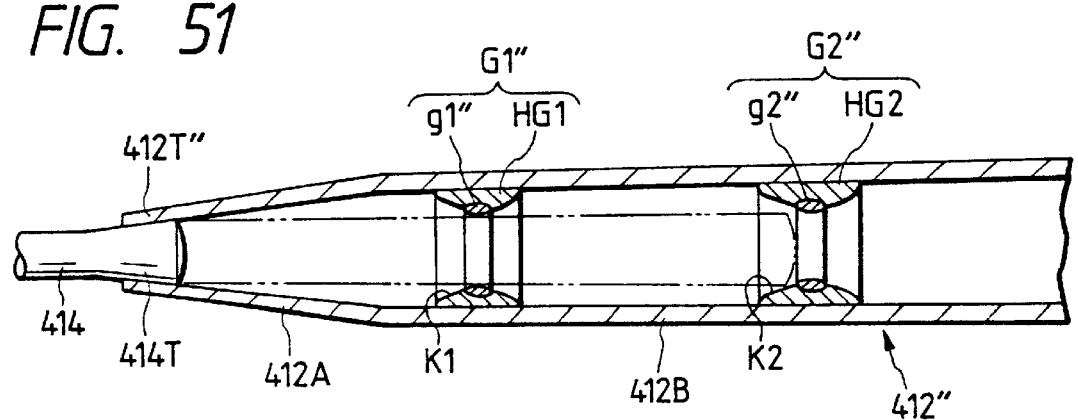
FIG. 51 is a longitudinal section view of the main portions of another embodiment of an intra-line fishing rod according to the invention.

Now, in FIG. 51, there is shown yet another embodiment of a joint type intra-line fishing rod according to the invention. In this embodiment, a middle rod 412" includes a portion 412A, which is formed in a tapered shape increasing steeply in diameter backwardly over a given range from of the leading end portion 412T" thereof to which the rear end portion 414T of a top rod 414 is jointed in a swing-out joint manner, and a large diameter hollow portion 412B which extends further backwardly of the steeply tapered portion 412A and is formed in a straight or gently tapered shape. In the interior portion of the large diameter hollow portion 412B, there is mounted a fishline guide G1" including a fishline guide main body g1" formed of ceramics and held by a holding member HG1 in such a manner that the fishline guide G1" projects inwardly.

In the rear interior portion of the middle rod 412", there is mounted a fishline guide G2" with a fishline guide main body g2" thereof held by a holding member HG2 in such a manner the fishline guide G2" projects inwardly and greatly. In the further backward portion of the middle rod 412", similarly, there is also mounted a fishline guide (not shown) in such a manner that it projects inwardly. Also, the inside diameters of the respective fishline guides are formed larger than the outside diameter of the rear end portion 414T of the top rod 414. Therefore, a fishline guide having a sufficient height can be mounted into the interior portion of the middle rod, which makes it possible to surely reduce the fishline insertion resistance and, in a swing-out joint type, the top rod 414 can be stored deep into the rear portion of the middle rod 412". Also, in an ordinary joint type fishing rod, the top rod can be stored into the middle rod 412" from the rear end thereof.

Further, alternatively, the steeply tapered portion 412A may be formed as a step-wise shaped portion.

Also, in the present embodiment, the front portions of the holding members HG1 and HG2 of the fishline guides G1" and G2" respectively include inclined guide portions K1 and K2 which are inclined in such a manner that they increase in height backwardly in the axial direction thereof. When the top rod 414 is stored in a swing-out manner, since the top rod 414 is separated from the joint portion, that is, the middle rod leading end portion 412T", there is produced a gap between the top rod 414 and the middle rod leading end portion 412T" and the top rod 414 can be thereby inclined. In this case, if the rear end of the top rod 414 is hitched on the fishline guide, then the top rod 414 cannot be stored smoothly into the middle rod rear portion. However, since the inclined guide portion K1 is formed in the front portion of the first fishline guide G1", thanks to the guide operation of the inclined guide portion K1, the rear end portion of the top rod 414 can be inserted smoothly through the first fishline guide G1" having an inside diameter substantially equal to the size of the top rod rear end portion. Therefore, after then, the top rod can be guided backwardly without being inclined greatly, while the rear end of the top rod inclined to a certain degree can be contacted with the inclined guide portion K2 or the like provided in the front portion of the backwardly located fishline guide G2" and thus can be inserted smoothly through the respective fishline guides.

The above-mentioned inclined guide portions are naturally effective in the embodiment shown in FIG. 51 and, preferably, they can also be applied to the embodiments respectively shown in FIGS. 49 and 50.

In the above-mentioned embodiments, the top rod 414 forms a small diameter rod pipe and the middle rod 412 forms a large diameter rod pipe. However, when second and third middle rods are interposed between the top rod and middle rod, then various combinations are possible: for example, the second middle rod may form a large diameter rod pipe, while the third middle rod may be composed of a small diameter rod pipe; or, the third middle rod may form a large diameter rod pipe, while the top rod may form a small diameter rod.

As can be seen clearly from the foregoing description, according to the invention, it is possible to provide a joint type intra-line fishing rod which allows a small diameter rod pipe to be stored into a hollow portion formed in the interior of a large diameter rod pipe as well as can reduce the resistance of a fishline when it is inserted.

What is claimed is:

1. An intra-line fishing rod comprising:
   a first hollow rod pipe having an inner circumferential surface at least partially tapered toward a front end of said hollow rod pipe;
   at least first, second and third loose fitting guide members elastically retained on a portion of said inner circumferential surface by contact between said fishline guide member and said portion, and movable from said portion toward a rear end of said hollow rod pipe by releasing the contact between said fishline guide member and said portion, said loose fitting guide members are adapted to collapse within said first hollow rod pipe and are provided with means for connecting each of said loose fitting guide members to an adjacent loose fitting guide member to define a contiguous row of loose fitting guide members, and wherein when said fishline guide members are collapsed to define said row, a first connecting holding force generated by said connecting means between said first and second fishline guide member is greater than a second connecting holding force generated by said connecting means between said second and third fishline guide members, said first fishline guide member being located closer to said front end than said third fishline guide member.

2. An intra-line fishing rod according to claim 1, further comprising:
   a second hollow rod pipe telescopic with respect to said first hollow rod so as to be stored within an interior defined by said inner circumferential surface and jointed on said front end,
   wherein a rear end of said second hollow rod pipe is abutable against said fishline guide member to release the contact between said fishline guide member and said portion during a course of a storage in which said second hollow pipe is retracted into said first hollow rod pipe.

3. An intra-line fishing rod according to claim 2, wherein said rear end of said second hollow rod pipe is removably received by said fishline guide member.

4. An intra-line fishing rod according to claim 1, wherein a plurality of said fishline guide members having different, respective outer dimensions are provided so as to be elastically retained at longitudinally different positions onto said inner circumferential surfaces.

5. An intra-line fishing rod according to claim 4, wherein a longitudinally adjacent pair of said fishline guide members are fittable to each other when they are moved toward said rear end of said hollow rod pipe.

6. An intra-line fishing rod comprising:
   a large diameter rod pipe;
   a small diameter rod pipe jointed to a leading end of said large diameter rod and capable of being stored into an interior of said large diameter rod pipe; and a plurality of loose fishline guide members retained at a provision position within said large diameter rod pipe so as to be projected inwardly of said large diameter rod pipe, wherein said small diameter rod pipe moves a forwardmost loose fishline guide member which in turn subsequently moves an adjacent rearward fishline guide member backwardly from said provision position by a course of storage wherein said small diameter rod pipe is stored into said interior of said large diameter rod pipe, said plurality of fishline guide members being adapted to collapse within said large diameter rod pipe to nest within an adjacent fishline guide member as said small diameter rod pipe is stored wherein a forwardly situated fishline guide member is inserted radially within an adjacent rearward fishline guide member and removably retained thereto.

7. An intra-line fishing rod comprising:

a first rod pipe defining at least partially tapered interior toward a front end; and at least first, second and third loose fitting guide members retained at longitudinally different positions within said interior so as to be projected inwardly and removable therefrom with given force, wherein the maximum outside diameter dimension of a forwardly situated loose fishline guide member is equal to or smaller than that of a backwardly situated loose fishline guide member, said fishline guide members are adapted to collapse within said interior and are provided with means for connecting each of said loose fitting guide members to an adjacent fishline guide member to define a contiguous row of fishline guide members, and wherein when said fishline guide members are collapsed to define said row, a first connecting holding force generated by said connecting means between said first and second fishline guide members is greater than a second connecting holding force generated by said connecting means between said second and third fishline guide members, said first fishline guide member being located closer to said front end than said third fishline guide member.

8. An intra-line fishing rod according to claim 7, further comprising a second rod pipe telescopic with respect to said first rod pipe, wherein, when said second rod pipe is stored into said first rod pipe, a rear end of said second rod pipe is connected to the most forwardly situated loose fishline guide member.

9. An intra-line fishing rod comprising:

a plurality of loose fishline guide members elastically pressed against an inner wall of a rod pipe, said plurality of fishline guide members are adapted to collapse within said rod pipe to nest within an adjacent fishline guide member wherein a forwardly situated fishline guide member is inserted radially within an adjacent rearward fishline guide member and removably retained thereto.

* * * * *